US012691708B2

(12) United States Patent
Koishikawa

(10) Patent No.: US 12,691,708 B2
(45) Date of Patent: Jul. 28, 2026

(54) TIRE

(71) Applicant: The Yokohama Rubber Co., LTD., Tokyo (JP)

(72) Inventor: Yoshifumi Koishikawa, Kanagawa (JP)

(73) Assignee: The Yokohama Rubber Co., LTD., Tokyo (JP)

( * ) Notice: Subject to any disclaimer, the term of this patent is extended or adjusted under 35 U.S.C. 154(b) by 71 days.

(21) Appl. No.: 18/006,670

(22) PCT Filed: Jul. 29, 2021

(86) PCT No.: PCT/JP2021/028062
§ 371 (c)(1),
(2) Date: Jan. 24, 2023

(87) PCT Pub. No.: WO2022/025172
PCT Pub. Date: Feb. 3, 2022

(65) Prior Publication Data
US 2023/0286326 A1      Sep. 14, 2023

(30) Foreign Application Priority Data
Jul. 29, 2020      (JP) ................................. 2020-128525

(51) Int. Cl.
*B60C 11/03* (2006.01)
*B60C 11/12* (2006.01)
(52) U.S. Cl.
CPC ...... *B60C 11/0306* (2013.01); *B60C 11/0304* (2013.01); *B60C 2011/0346* (2013.01); (Continued)
(58) Field of Classification Search
CPC ............. B60C 11/0306; B60C 11/0304; B60C 11/1369; B60C 2011/0341; (Continued)

(56) References Cited

U.S. PATENT DOCUMENTS

2014/0238568 A1* 8/2014 Haga ................... B60C 11/0309
152/209.18
2016/0250897 A1* 9/2016 Fujioka ............... B60C 11/0306
152/209.23
(Continued)

FOREIGN PATENT DOCUMENTS

EP          728599 A1 * 8/1996      ......... B60C 11/0309
JP       10-100617 A      4/1998
(Continued)

*Primary Examiner* — Katelyn W Smith
*Assistant Examiner* — Thomas Frank Schneider
(74) *Attorney, Agent, or Firm* — Thorpe North & Western, LLP

(57) ABSTRACT

A pneumatic tire includes circumferential grooves, lug grooves, land portions defined by the circumferential grooves and the lug grooves, and a narrow groove in the land portions that extends in a circumferential direction. At least one of the circumferential grooves that defines the land portions in which the narrow groove is disposed has an amplitude in a width direction while extending in the circumferential direction to be formed in zigzag shape including long and short portions having relatively different lengths. The narrow groove has one or more bent portions where an extension direction changes in the land portions to include a long portion and a short portion having relatively different lengths. The long portion of the narrow groove has an inclination direction in the width direction with respect to the circumferential direction in a direction opposite to the long portion of the at least one of the circumferential grooves.

22 Claims, 8 Drawing Sheets

(52) U.S. Cl.
CPC ................. *B60C 2011/0348* (2013.01); *B60C*
*2011/0353* (2013.01); *B60C 2011/0355*
(2013.01); *B60C 2011/0365* (2013.01); *B60C*
*2011/0381* (2013.01); *B60C 2011/1213*
(2013.01); *B60C 11/1236* (2013.01)

(58) Field of Classification Search
CPC ..... B60C 2011/0346; B60C 2011/0348; B60C
2011/0381; B60C 2011/0383; B60C
2011/0355; B60C 2011/1213
See application file for complete search history.

(56) References Cited

U.S. PATENT DOCUMENTS

| | | | | |
|---|---|---|---|---|
| 2016/0272010 A1 * | 9/2016 | Washizuka | ........... | B60C 11/033 |
| 2016/0297255 A1 * | 10/2016 | Wakizono | .......... | B60C 11/0327 |
| 2019/0092100 A1 * | 3/2019 | Takata | ................... | B60C 11/03 |

FOREIGN PATENT DOCUMENTS

| | | | | | |
|---|---|---|---|---|---|
| JP | 2006-315433 A | | 11/2006 | | |
| JP | 2008030605 A | * | 2/2008 | | |
| JP | 2008-201368 A | | 9/2008 | | |
| JP | 2009-274669 A | | 11/2009 | | |
| JP | 2012-046105 A | | 3/2012 | | |
| JP | 2013112294 A | * | 6/2013 | ........ | B60C 11/0304 |
| JP | 2016-002794 A | | 1/2016 | | |
| JP | 2016-199119 A | | 12/2016 | | |
| JP | 2017-217960 A | | 12/2017 | | |
| JP | 2019-043492 A | | 3/2019 | | |
| JP | 2019-156101 A | | 9/2019 | | |
| WO | 2010/008027 A1 | | 1/2010 | | |
| WO | WO-2018225371 A1 | * | 12/2018 | ........ | B60C 11/0302 |

* cited by examiner

| | | Conventional Example | Comparative Example | Example 1 | Example 2 |
|---|---|---|---|---|---|
| Circumferential narrow groove | Bent portion | No | No | One | Two |
| | Is inclination direction of long portion opposite direction to long portion of circumferential groove? | No | Yes | Yes | Yes |
| | Disposed position of circumferential groove where inclination direction of long portion is opposite direction | - | Inner side in tire width direction | Inner side in tire width direction | Inner side in tire width direction |
| | At least one end is open to lug groove | Yes | Yes | Yes | Yes |
| | Groove depth | Constant at 4 mm | Constant at 4 mm | Long portion 6 mm / Short portion 3 mm | Long portion 6 mm / Short portion 3 mm |
| | Angle of long portion with respect to tire circumferential direction | 10° | 10° | 10° | 10° |
| Circumferential groove | Angle of long portion with respect to tire circumferential direction | 10° | 10° | 10° | 10° |
| Performance | Braking on snow index value | 100 | 103 | 104 | 106 |
| | Braking on ice index value | 100 | 98 | 103 | 105 |
| | Wet braking index value | 100 | 100 | 101 | 103 |

FIG. 7A

| | | Example 3 | Example 4 | Example 5 | Example 6 | Example 7 |
|---|---|---|---|---|---|---|
| Circumferential narrow groove | Bent portion | Two | Two | Two | Two | Two |
| | Is inclination direction of long portion opposite direction to long portion of circumferential groove? | Yes | Yes | Yes | Yes | Yes |
| | Disposed position of circumferential groove where inclination direction of long portion is opposite direction | Outer side in tire width direction | Inner side in tire width direction | Inner side in tire width direction | Inner side in tire width direction | Inner side in tire width direction |
| | At least one end is open to lug groove | Yes | No | Yes | Yes | Yes |
| | Groove depth | Long portion 6 mm / Short portion 3 mm | Long portion 6 mm / Short portion 3 mm | Constant at 4 mm | Long portion 6 mm / Short portion 3 mm | Long portion 6 mm / Short portion 3 mm |
| | Angle of long portion with respect to tire circumferential direction | 10° | 10° | 10° | 55° | 10° |
| Circumferential groove | Angle of long portion with respect to tire circumferential direction | 10° | 10° | 10° | 10° | 40° |
| Performance | Braking on snow index value | 106 | 103 | 103 | 105 | 107 |
| | Braking on ice index value | 103 | 104 | 105 | 104 | 106 |
| | Wet braking index value | 103 | 101 | 101 | 101 | 101 |

FIG. 7B

TIRE

TECHNICAL FIELD

The present technology relates to a tire.

BACKGROUND ART

A tire mounted on a vehicle has grooves in a tread portion for the purpose of, for example, ensuring various performances according to a usage aspect of the tire, and the performances are improved by devising the shapes of the grooves. For example, in a pneumatic tire described in Japan Unexamined Patent Publication No. 2016-002794 A, providing first circumferential main grooves, second circumferential main grooves, and circumferential auxiliary grooves extending in zigzag shapes improves performance on snow and quietness in a well-balanced manner. Additionally, in a pneumatic tire described in Japan Unexamined Patent Publication No. 2012-046105 A, providing a circumferential groove extending in a zigzag shape along a tire circumferential direction and a sipe that bends and extends in the tire circumferential direction achieves suppressing decrease in drainage performance and uneven wear while increasing driving performance and braking performance on icy and snowy roads.

Additionally, in a pneumatic tire described in Japan Unexamined Patent Publication No. 2006-315433 A, providing a bent narrow groove that bends and extends at predetermined circumferential pitches in a wide center land portion row achieves improvement in braking and driving performance both on wet road surfaces and icy and snowy road surfaces. In addition, in a pneumatic tire described in International Patent Publication No. WO 2010/008027, in a center block row, center lug grooves having mutually different inclination directions with respect to a tire width direction are formed so as to cross the center block row, and in a second block row, subsidiary grooves inclined with respect to a tire circumferential direction are formed to improve various tire performances on snow and ice.

SUMMARY

Here, performance required for grooves formed in a tread portion includes wet performance that ensures drainage properties of water of the tread portion and a road surface when traveling on a wet road surface. In addition, performance on snow and performance on ice are also important for a studless tire, which is required to travel on snow-covered road surfaces and icy and snowy road surfaces. To improve performance on snow, it is effective to connect circumferential grooves adjacent in a tire width direction with a lug groove extending in the tire width direction or incline the circumferential groove extending in a tire circumferential direction with respect to the tire circumferential direction to increase the area of the grooves formed in the tread portion and to increase snow column shear force. Moreover, when the area of the grooves is increased in this way, drainage properties are also improved, and therefore it is effective to improve wet performance.

How ever, when the groove area is increased, the rigidity of land portions decreases. Thus, when the land portion flexes during braking, the ground contact area decreases, and braking performance on ice possibly decreases. That is, when the groove area is increased, performance on ice is possibly reduced. As a result, satisfying all of performances of performance on snow, wet performance, and performance on ice has been extremely difficult.

The present technology is made in view of the foregoing problems, and an object of the present technology is to provide a tire that can ensure performance on snow and wet performance while suppressing a decrease in performance on ice.

In order to solve the problem described above and achieve the object, a tire according to an embodiment of the present technology includes a plurality of circumferential grooves, a plurality of lug grooves, a plurality of land portions, and a circumferential narrow groove. The plurality of circumferential grooves extend in a tire circumferential direction. The plurality of lug grooves extend in a tire width direction. The plurality of land portions are defined by the circumferential grooves and the lug grooves. The circumferential narrow groove extends in the tire circumferential direction and is disposed in the land portion. The at least one circumferential groove among the circumferential grooves that define the land portion in which the circumferential narrow groove is disposed having an amplitude in the tire width direction while extending in the tire circumferential direction to be formed in a zigzag shape including a long portion and a short portion having relatively different lengths. The circumferential narrow groove has one or more bent portions where an extension direction changes in the land portion to include a long portion and a short portion having relatively different lengths. The long portion of the circumferential narrow groove has an inclination direction in the tire width direction with respect to the tire circumferential direction in a direction opposite to the long portion of the circumferential groove.

Additionally, in the tire described above, both of the two circumferential grooves that define both sides in the tire width direction of the land portion in which the circumferential narrow groove is disposed are preferably formed in a zigzag shape. The long portion of the circumferential narrow groove preferably has an inclination direction in the tire width direction with respect to the tire circumferential direction in a direction opposite to the long portion of the circumferential groove positioned on an inner side in the tire width direction among the two circumferential grooves that define both the sides in the tire width direction of the land portion in which the circumferential narrow groove is disposed.

Additionally, in the tire described above, the circumferential narrow groove preferably has at least one end opening to the lug groove.

Additionally, in the tire described above, the circumferential narrow groove preferably has a change point of a groove depth at least at one location in the land portion.

In addition, in the tire described above, the long portion of the circumferential narrow groove preferably has an inclination in the tire width direction with respect to the tire circumferential direction in a range from 5° or more to 45° or less.

In addition, in the tire described above, the long portion of the circumferential groove preferably has an inclination in the tire width direction with respect to the tire circumferential direction in a range from 50 or more to 30° or less.

In addition, in the tire described above, at least the one bent portion among the bent portions included in the circumferential narrow groove preferably has a bend angle of 900 or more.

Additionally, in the tire described above, in the circumferential narrow groove, a total length of the long portions included in the single circumferential narrow groove is preferably in a range from 60% or more to 90% or less of a whole length of the single circumferential narrow groove.

Additionally, in the tire described above, the bent portion of the circumferential narrow groove is preferably disposed in a range of 40% of a maximum width of the land portion in the tire width direction with a center in the tire width direction of the land portion in which the circumferential narrow groove is disposed as a center.

Additionally, in the tire described above, the circumferential groove preferably has a groove width in a range from 3.5 mm or more to 12 mm or less. The circumferential narrow groove preferably has a groove width in a range from 1.5 mm or more to 4 mm or less.

Additionally, in the tire described above, in the land portion, a plurality of sipes extending in the tire width direction are preferably disposed.

Additionally, in the tire described above, the sipe is preferably inclined with respect to the tire circumferential direction in a direction opposite to an inclination direction of the long portion of the circumferential narrow groove in the tire width direction with respect to the tire circumferential direction.

The tire according to an embodiment of the present technology has an effect that can ensure performance on snow and wet performance while suppressing a decrease in performance on ice.

BRIEF DESCRIPTION OF DRAWINGS

FIGS. 7A-7B include a table showing results of performance evaluation tests of pneumatic tires.

DETAILED DESCRIPTION

Tires according to embodiments of the present technology will be described in detail below with reference to the drawings. However, the present technology is not limited to the embodiment. Constituents of the following embodiments include elements that can be substituted and easily conceived of by a person skilled in the art or that are essentially identical.

Embodiments

In the following description, a description will be given using a pneumatic tire 1 as an example of the tire according to the embodiments of the present technology. The pneumatic tire 1 as an example of the tire can be inflated with any gas including air and inert gas, such as nitrogen.

Hereinafter, the term "tire radial direction" refers to a direction orthogonal to a tire rotation axis (not illustrated) that is a rotation axis of the pneumatic tire 1, the term "inner side in a tire radial direction" refers to a side toward the tire rotation axis in the tire radial direction, and the term "outer side in the tire radial direction" refers to a side away from the tire rotation axis in the tire radial direction. The term "tire circumferential direction" refers to a circumferential direction with the tire rotation axis as a center axis. Additionally, the term "tire width direction" refers to a direction parallel with the tire rotation axis, the term "inner side in the tire width direction" refers to a side toward a tire equatorial plane (tire equator line) CL in the tire width direction, and the term "outer side in the tire width direction" refers to a side away from the tire equatorial plane CL in the tire width direction. The term "tire equatorial plane CL" refers to a plane that is orthogonal to the tire rotation axis and that runs through the center of the tire width of the pneumatic tire 1. The tire equatorial plane CL aligns, in a position in the tire width direction, with a center line in the tire width direction corresponding to a center position of the pneumatic tire 1 in the tire width direction. The tire width is the width in the tire width direction between portions located on the outermost sides in the tire width direction, or in other words, the distance between the portions that are the most distant from the tire equatorial plane CL in the tire width direction. "Tire equator line" refers to a line in the tire circumferential direction of the pneumatic tire 1 that lies on the tire equatorial plane CL. In the description below. "tire meridian section" refers to a cross-section of the tire taken along a plane that includes the tire rotation axis.

Figure 1:
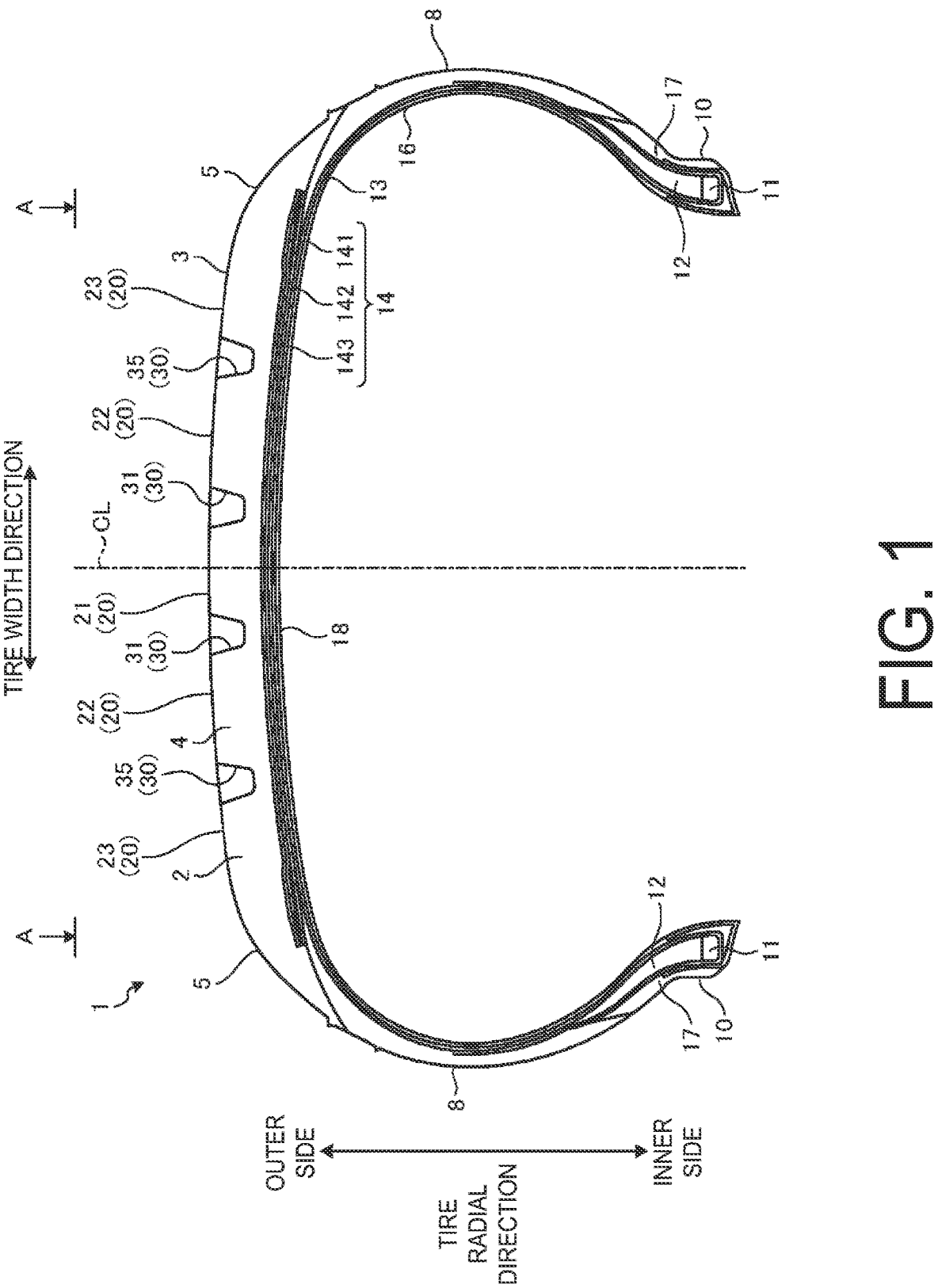
FIG. 1 is a tire meridian cross-sectional view illustrating a main portion of a pneumatic tire according to an embodiment.

FIG. 1 is a tire meridian cross-sectional view illustrating a main portion of the pneumatic tire 1 according to an embodiment. In the pneumatic tire 1 according to the present embodiment, a tread portion 2 is disposed on a portion on the outermost side in the tire radial direction when viewed in a tire meridian cross-section, and the tread portion 2 includes a tread rubber layer 4 made of a rubber composition. Additionally, a surface of the tread portion 2, that is, a portion that comes into contact with road surfaces when driving a vehicle (not illustrated) on which the pneumatic tires 1 are mounted is formed as a tread ground contact surface 3, and the tread ground contact surface 3 forms a portion of a contour of the pneumatic tire 1.

Shoulder portions 5 are positioned at both ends on outer sides of the tread portion 2 in the tire width direction, and sidewall portions 8 are disposed on inner sides in the tire radial direction of the shoulder portions 5. In other words, the sidewall portions 8 are disposed on both sides in the tire width direction of the tread portion 2. In other words, the sidewall portions 8 are disposed at two sections on both sides in the tire width direction of the pneumatic tire 1 and form portions exposed to the outermost sides in the tire width direction of the pneumatic tire 1.

A bead portion 10 is located on an inner side in the tire radial direction of each of the sidewall portions 8 located on both sides in the tire width direction. Similarly to the sidewall portions 8, the bead portions 10 are disposed at two sections on both sides of the tire equatorial plane CL. That is, a pair of the bead portions 10 is disposed on both sides in the tire width direction of the tire equatorial plane CL. The bead portions 10 each include a bead core 11, and a bead filler 12 is provided in the outer side of the bead core 11 in the tire radial direction. The bead core 11 is an annular member formed by bundling bead wires, which are steel wires, and the bead filler 12 is a rubber member disposed in the outer side of the bead core 11 in the tire radial direction.

A belt layer 14 is disposed in the tread portion 2. The belt layer 14 is formed by a multilayer structure in which a plurality of belts 141, 142 and a belt cover 143 are layered, and the two layers of the belts 141, 142 are layered in the present embodiment. The belts 141, 142 constituting the belt layer 14 are formed by rolling and covering, with coating rubber, a plurality of belt cords made of steel or an organic fiber material, such as polyester, rayon, or nylon, and a belt angle defined as an inclination angle of the belt cords with respect to the tire circumferential direction is within a predetermined range (for example, of 20° or more and 55° or less). Furthermore, the belt angles of the two layers of the belts 141, 142 differ from each another. Accordingly, the belt layer 14 is configured as a so-called crossply structure in which the two layers of the belts 141, 142 are layered with the inclination directions of the belt cords intersecting with each another. In other words, the two layers of the belts 141, 142 are provided as so-called cross belts in which the belt cords provided with the respective belts 141, 142 are disposed in mutually intersecting orientations.

The belt cover 143 is formed by rolling and covering, with coating rubber, a plurality of belt cover cords made from steel or an organic fiber material, such as polyester, rayon, or nylon, and a belt angle defined as an inclination angle of the belt cover cords with respect to the tire circumferential direction is within a predetermined range (for example, 0° or more and 10° or less). Additionally, the belt cover 143 is, for example, a strip material formed by coating one or a plurality of belt cover cords with a coating rubber, where the strip material is formed by winding the strip material spirally around a tire rotation axis from outer side in the tire radial direction of the two-layer belts 141, 142.

A carcass layer 13 containing the cords of radial plies is continuously provided on an inner side in the tire radial direction of the belt layer 14 and on a side of the sidewall portion 8 close to the tire equatorial plane CL.

Accordingly, the pneumatic tire 1 according to the present embodiment is configured as a so-called radial tire. The carcass layer 13 has a single layer structure made of one carcass ply or a multilayer structure made of a plurality of carcass plies, and spans between the pair of bead portions 10 disposed on both sides in the tire width direction in a toroidal shape to form a framework of the tire.

Specifically, the carcass layer 13 is disposed from one to the other of the pair of bead portions 10 located on both sides in the tire width direction and is turned back toward the outer side in the tire width direction along the bead cores 11 at the bead portions 10, wrapping around the bead cores 11 and the bead fillers 12. The bead filler 12 is a rubber member disposed in a space in the outer side of the bead core 11 in the tire radial direction, the space being formed by folding the carcass layer 13 back at the bead portion 10. Moreover, the belt layer 14 is disposed on the outer side in the tire radial direction of a portion, located in the tread portion 2, of the carcass layer 13 spanning between the pair of bead portions 10. The carcass ply of the carcass layer 13 is made by coating, with coating rubber, and rolling a plurality of carcass cords made from steel or an organic fiber material such as aramid, nylon, polyester, or rayon. The plurality of carcass cords forming the carcass ply is disposed in parallel at an angle in the tire circumferential direction, the angle with respect to the tire circumferential direction being along a tire meridian direction.

At the bead portion 10, a rim cushion rubber 17 is disposed on an inner side in the tire radial direction and an outer side in the tire width direction of the bead core 11 and a turned back portion of the carcass layer 13, the rim cushion rubber 17 forming a contact surface of the bead portion 10 against the rim flange. Additionally, an innerliner 16 is formed along the carcass layer 13 on the inner side of the carcass layer 13 or on the inner portion side of the carcass layer 13 in the pneumatic tire 1. The innerliner 16 forms a tire inner surface 18 that is a surface on the inner side of the pneumatic tire 1.

Figure 2:
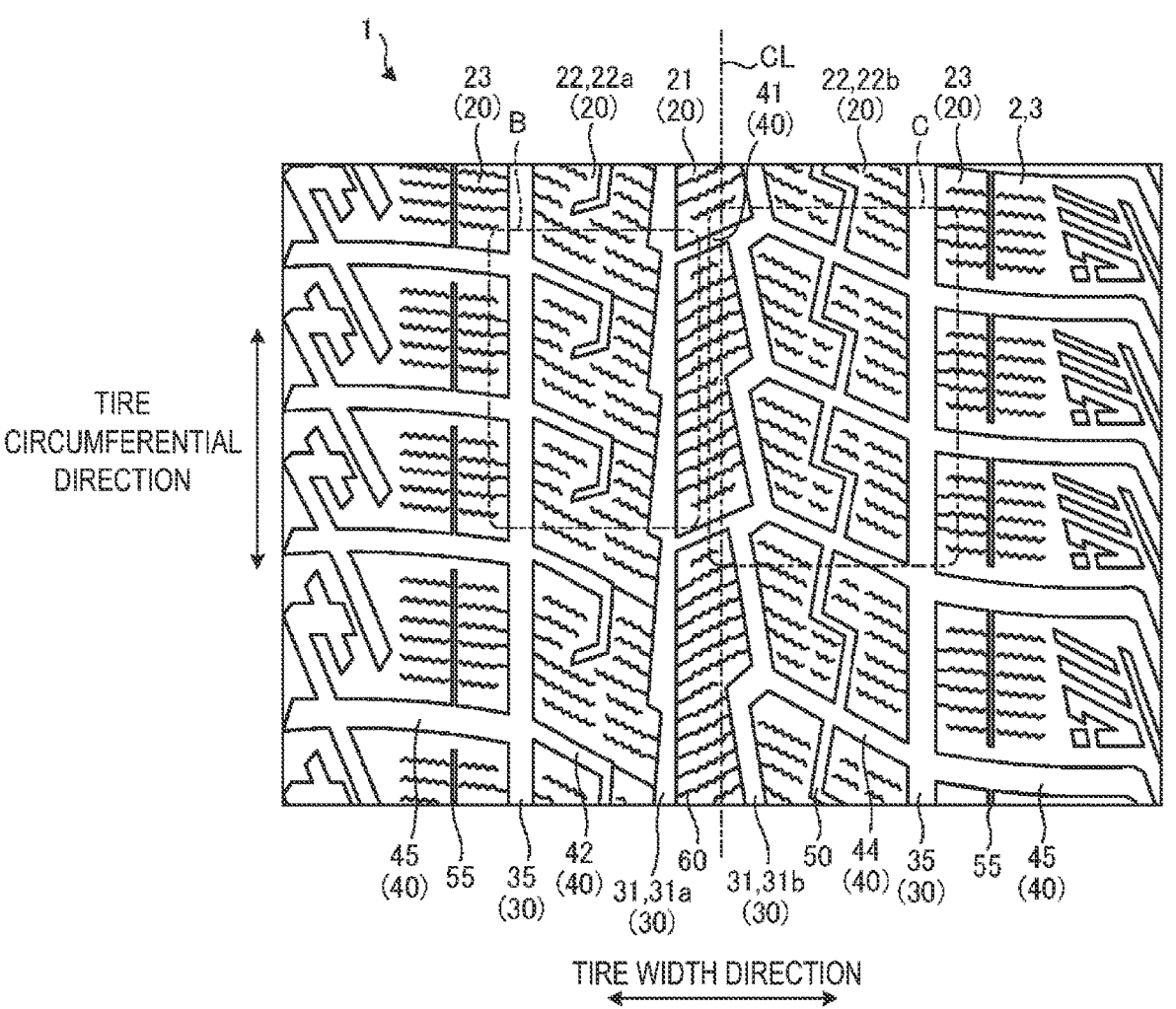
FIG. 2 is a view taken along line A-A of FIG. 1 in the direction of the arrows.

FIG. 2 is a view taken along line A-A of FIG. 1 in the direction of the arrows. A plurality of circumferential grooves 30 extending in the tire circumferential direction and a plurality of lug grooves 40 extending in the tire width direction are formed in the tread ground contact surface 3 in the tread portion 2. A plurality of land portions 20 are defined by the circumferential grooves 30 and the lug grooves 40 on the surface of the tread portion 2. In the present embodiment, the four circumferential grooves 30 are formed side by side in the tire width direction. In detail, the four circumferential grooves 30 are two inner circumferential grooves 31 disposed on both sides of the equatorial plane CL in the tire width direction with the tire equatorial plane CL interposed therebetween and two outer circumferential grooves 35 disposed by one on the outer sides of each of the two inner circumferential grooves 31 in the tire width direction. The circumferential grooves 30 have a groove width in the range from 3.5 mm or more to 12 mm or less and a groove depth in the range from 6.0 or more to 10.0 mm or less.

The land portions 20 defined by the circumferential grooves 30 include a center land portion 21, a second land portion 22, and a shoulder land portion 23. Among these, the center land portion 21 is the land portion 20 located between the inner circumferential grooves 31 and both sides in the tire width direction are defined by the inner circumferential grooves 31. Additionally, the second land portion 22 is the land portion 20 located between the inner circumferential groove 31 and the outer circumferential groove 35 adjacent in the tire width direction. The portion on the inner side in the tire width direction is defined by the inner circumferential grooves 31, and the portion on the outer side in the tire width direction is defined by the outer circumferential groove 35. Moreover, the shoulder land portion 23 is the land portion 20 located on the outer side of the outer circumferential groove 35 in tire width direction, and the inside in the tire width direction is defined by the outer circumferential groove 35. Also, the respective second land portions 22 and shoulder land portions 23 are disposed on both sides of the tire equatorial plane CL in the tire width direction.

Among the four circumferential grooves 30, both of the two outer circumferential grooves 35 linearly extend in the tire circumferential direction. On the other hand, among the four circumferential grooves 30, in both of the two inner circumferential grooves 31, at least one of groove walls on both sides in the groove width direction is formed in a zigzag shape by amplitude in the tire width direction while extending in the tire circumferential direction.

Specifically, when the two inner circumferential grooves 31 are defined as a first inner circumferential groove 31a and a second inner circumferential groove 31b, among the groove walls on both sides in the groove width direction, the groove wall of the first inner circumferential groove 31a outer side in the tire width direction is formed in a zigzag shape, and the groove wall on the inner side in the tire width direction is formed to linearly extend in the tire circumferential direction. In the second inner circumferential groove 31b, while the entire second inner circumferential groove 31b extends in the tire circumferential direction, the entire second inner circumferential groove 31b forms an amplitude in the tire width direction to form a zigzag shape. Thus, while the groove width is maintained constant, both of the groove walls on both sides in the groove width direction of the second inner circumferential groove 31*b* are formed in the zigzag shape.

The lug grooves 40 include a center lug groove 41, a bent lug groove 42, a communication lug groove 44, and a shoulder lug groove 45. Among these, the center lug groove 41 is disposed between the two inner circumferential grooves 31. While the center lug groove 41 extends in the tire width direction, the center lug groove 41 is inclined in the tire circumferential direction with respect to the tire width direction, and has respective both ends opening to the inner circumferential grooves 31. Therefore, the center land portions 21 defined by the inner circumferential grooves 31 and the center lug grooves 41 have both ends in the tire width direction defined by the inner circumferential grooves 31 and both sides in the tire circumferential direction defined by the center lug grooves 41 to form the block-shaped land portion 20.

Also, the bent lug groove 42 is disposed between the first inner circumferential groove 31*a* and the outer circumferential groove 35 adjacent to the first inner circumferential groove 31*a*. In other words, the bent lug groove 42 is disposed in a first second land portion 22*a*, which is the second land portion 22, located between the first inner circumferential groove 31*a* and the outer circumferential groove 35 among the second land portions 22 disposed on both sides of the tire equatorial plane CL in the tire width direction. In this way, the bent lug groove 42, which is the lug groove 40, disposed in the land portion 20 having both sides in the tire width direction defined by the circumferential grooves 30 has one end opening to the circumferential groove and the other end that terminates in the land portion 20, and is formed to bend at a plurality of locations. In other words, the bent lug grooves 42 are the lug groove 40 opening at one side in which the one end opens to the circumferential groove 30 and the other end does not open.

Specifically, the bent lug groove 42 has one end opening to the outer circumferential groove 35 and the other end that terminates in the first second land portion 22*a*, and bends at two locations between the end portion on the side opening to the outer circumferential groove 35 and the end portion on the side terminating in the first second land portion 22*a*. In other words, the bent lug groove 42 is open to the outer circumferential groove 35 that defines the outer side in the tire width direction among the two circumferential grooves 30 that define both sides of the first second land portion 22*a* in the tire width direction. A plurality of the bent lug grooves 42 are disposed side by side in the tire circumferential direction in the similar aspect. Additionally, in the bent lug groove 42, since one end portion among both ends of the bent lug groove 42 in the extension direction terminates in the first second land portion 22*a*, the first second land portion 22*a* is not divided in the tire circumferential direction by the bent lug groove 42. Thus, the first second land portions 22*a* are the rib-like land portions 20 formed continuously in the tire circumferential direction.

Also, the communication lug groove 44 is disposed between the second inner circumferential groove 31*b* and the outer circumferential groove 35 adjacent to the second inner circumferential groove 31*b*. While the communication lug groove 44 extends in the tire width direction, the communication lug groove 44 is inclined in the tire circumferential direction with respect to the tire width direction, and has one end opening to the second inner circumferential groove 31*b* and the other end opening to the outer circumferential groove 35. In this way, the communication lug grooves 44 disposed between the second inner circumferential groove 31*b* and the outer circumferential groove 35 are the lug grooves 40 that define the second land portion 22*b*, which is the second land portion 22, located between the second inner circumferential groove 31*b* and the outer circumferential groove 35. Therefore, the second land portion 22*b* is the block-shaped land portion 20 having both sides in the tire width direction defined by the second inner circumferential groove 31*b* and the outer circumferential groove 35, and both sides in the tire circumferential direction defined by the communication lug grooves 44.

Also, the respective shoulder lug grooves 45 are disposed on the outer sides in the tire width direction of the outer circumferential grooves 35 located on both sides of the tire equatorial plane CL in the tire width direction. Each shoulder lug groove 45 is formed to extend in the tire width direction, the end portion on the inner side in the tire width direction opens to the outer circumferential groove 35, and the end portion on the outer side in the tire width direction terminates at a so-called design end, which is the end portion of the tread pattern of the tread portion 2 in the tire width direction. Thus, the shoulder lug grooves 45 formed between the outer circumferential groove 35 and the design end become the lug grooves 40 that define the shoulder land portion 23 together with the outer circumferential groove 35. Thus, the shoulder land portion 23 becomes the block-shaped land portions 20 in which both sides in the tire circumferential direction are defined by the shoulder lug grooves 45.

The lug groove 40 formed in this manner has a groove width of within a range from 3.0 mm or more to 8.0 mm or less, and a groove depth of within a range from 6.0 mm or more to 9.0 mm or less.

Furthermore, the circumferential narrow groove 50 is disposed in the second land portion 22*b* located between the second inner circumferential groove 31*b* and the outer circumferential groove 35. The circumferential narrow groove 50 has a groove narrower than the groove width of the circumferential grooves 30, and the groove width of the circumferential narrow groove 50 is formed within the range from 1.5 mm or more to 4 mm or less. In addition, the circumferential narrow groove 50 has a groove depth within the range from 3.5 or more to 7.0 or less.

The circumferential narrow groove 50 extends in the tire circumferential direction and is disposed in the second land portion 22*b*, and has respective both ends in the tire circumferential direction open to the communication lug grooves 44 that define the second land portion 22*b*. The circumferential narrow groove 50 is formed with a portion that bends in the tire width direction while extending in the tire circumferential direction, and in the present embodiment, the circumferential narrow groove 50 bends at two locations to be disposed in the second land portion 22*b* in a crank-like shape.

Additionally, in the shoulder land portion 23 located on the outer side of the outer circumferential groove 35 in the tire width direction, a shoulder narrow groove 55 extending in the tire circumferential direction is disposed. The shoulder narrow groove 55 extending in the tire circumferential direction has one end opening to the shoulder lug groove 45 and the other end terminating in the shoulder land portion 23. In the shoulder narrow grooves 55 disposed in the shoulder land portions 23, all of the end portions on the sides opening to the shoulder lug grooves 45 of the shoulder narrow grooves 55 located on the same side with respect to the tire equatorial plane CL in the tire width direction are end portions on the same side in the tire circumferential direction. That is, all of the shoulder narrow grooves 55 disposed in the shoulder land portion 23 defined by the same outer circumferential groove 35 have the same direction in the tire circumferential direction.

In addition, in the shoulder narrow grooves 55 disposed on one side and the shoulder narrow grooves 55 disposed on the other side of the tire equatorial plane CL in the tire width direction, the end portions on the sides opening to the shoulder lug grooves 45 and the end portions on the sides terminating in the shoulder land portions 23 are the end portions on the sides different from one another. That is, in the shoulder narrow groove 55 disposed on one side and the shoulder narrow groove 55 disposed on the other side of the tire equatorial plane CL in the tire width direction, the directions in the circumferential direction are mutually opposite.

Further, each land portion 20 includes a plurality of sipes 60 extending in the tire width direction. The sipe 60 disposed in the land portion 20, for example, repeatedly bends in the tire circumferential direction and forms an amplitude while extending in the tire width direction to be formed in a zigzag shape. The end portion of each sipe 60 may terminate in the land portion 20 or may open to another groove. In the pneumatic tire 1 according to the present embodiment, the sipes 60 are thus disposed in each of the land portions 20. Thus, the pneumatic tire 1 is applied to a studless tire that ensures running performance on icy and snowy road surfaces or an all-season tire that ensures running performance in winter.

The sipes 60 described herein are formed in a narrow groove shape on the tread ground contact surface 3. When the pneumatic tire 1 is mounted on a specified rim and placed in an unloaded state under internal pressure conditions of a specified internal pressure, wall surfaces constituting the narrow groove do not contact one another. Meanwhile, in a case where the narrow groove is located in a portion of the road contact surface formed on a flat plate when a load is vertically applied on the flat plate, or in a case where the land portion in which the narrow grooves are formed flexes, the wall surfaces constituting the narrow groove or at least part of portions disposed on the wall surfaces come into contact with each other due to deformation of the land portion 20. In the present embodiment, the sipe 60 has a groove width of 1.4 mm or less, and a maximum depth from the tread ground contact surface 3 is within a range of 3.5 mm or more to 9.0 mm or less.

Here, "specified rim" refers to a "standard rim" defined by JATMA (The Japan Automobile Tyre Manufacturers Association, Inc.), a "Design Rim" defined by TRA (The Tire and Rim Association, Inc.), or a "Measuring Rim" defined by ETRTO (The European Tyre and Rim Technical Organisation). Moreover, the specified internal pressure refers to a "maximum air pressure" defined by JATMA, a maximum value in "TIRE LOAD LIMITS AT VARIOUS COLD INFLATION PRESSURES" defined by TRA, or "INFLATION PRESSURES" defined by ETRTO.

The sipes 60 may be so-called three-dimensional sipes or two-dimensional sipes. The three-dimensional sipe here is the sipe 60 having a wall surface in a bent shape with an amplitude in the width direction of the sipe 60 both in a cross-sectional view having a length direction of the sipe 60 as a normal line direction (a cross-sectional view including the width direction and the depth direction of the sipe 60) and a cross-sectional view having the depth direction of the sipe 60 as a normal line direction (a cross-sectional view including the width direction and the length direction of the sipe 60). The two-dimensional sipe means the sipe 60 having a wall surface in a straight shape in any cross-sectional view (a cross-sectional view including the width direction and the depth direction of the sipe 60) having the length direction of the sipe 60 as the normal line direction.

Figure 3:
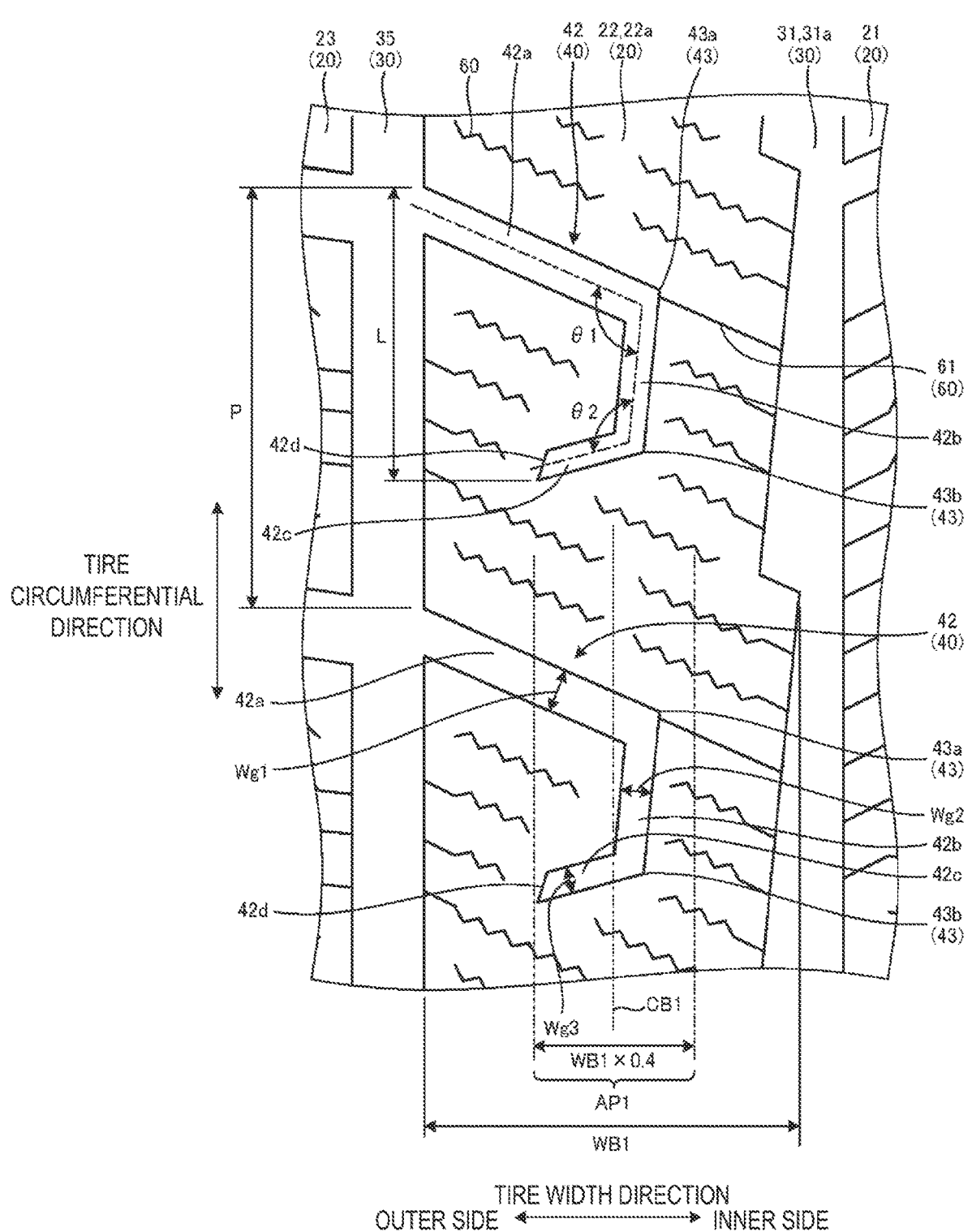
FIG. 3 is a detailed view of portion B of FIG. 2.

FIG. 3 is a detailed view of portion B of FIG. 2. The bent lug groove 42 disposed in the first second land portion 22a and formed by bending at a plurality of locations is the lug groove 40 having two or more bent portions 43 where the extension direction changes. In the present embodiment, the bent lug groove 42 has the two bent portions 43, and has a first bent portion 43a, which is the bent portion 43 located on the outer circumferential groove 35 side in the bent lug groove 42, and a second bent portion 43b, which is the bent portion 43 located on the end portion side terminating in the first second land portion 22a in the bent lug groove 42. As a result, the bent lug groove 42 has a first extending portion 42a, a second extending portion 42b, and a third extending portion 42c with the two bent portions 43 as boundaries.

Specifically, the first extending portion 42a is a portion located between the end portion on the side opening to the outer circumferential groove 35 and the first bent portion 43a in the bent lug groove 42. Additionally, the second extending portion 42b is a portion between the first bent portion 43a and the second bent portion 43b in the bent lug groove 42. Additionally, the third extending portion 42c is a portion between a terminating end portion 42d as an end portion on the side terminating in the first second land portion 22a and the second bent portion 43b in the bent lug groove 42.

Additionally, in the two bent portions 43 of the bent lug groove 42, the bending directions in the groove width direction of the bent lug groove 42 are the same direction in the first bent portion 43a and the second bent portion 43b. In other words, in the two bent portions 43 of the bent lug groove 42, the groove walls of the bent lug groove 42 located on the minor angle sides of the bends are groove walls on the same side in the groove width direction in the two bent portions 43.

Also, the bent portion 43 included in the bent lug groove 42 has a bend angle of 90° or more. In other words, the bent lug groove 42 has an angle θ1 of the first bent portion 43a of 90° or more, an angle θ2 of the second bent portion 43b is also 90° or more. In this case, the angle of bend of the bent portion 43 is the angle on the minor angle side of the bend. That is, in the bent portion 43 of the bent lug groove 42, the bend angle is formed by an obtuse angle. Also, the bend angle of the bent portion 43 is the angle at the center line of the groove width of the bent lug groove 42. Note that the angle θ1 of the first bent portion 43a is preferably within the range 90°≤θ1≤130°, and the angle θ2 of the second bent portion 43b is preferably within the range 90°≤θ2≤130°.

The bent lug groove 42 includes the first extending portion 42a, the second extending portion 42b, and the third extending portion 42c by bending at the two bent portions 43. The first extending portion 42a extends to be formed at an angle close to the tire width direction, and the second extending portion 42b extends to be formed at an angle close to the tire circumferential direction. For example, the inclination angle of the first extending portion 42a in the tire width direction with respect to the tire circumferential direction is preferably within a range from 55° or more to 75° or less. The inclination angle of the second extending portion 42b in the tire width direction with respect to the tire circumferential direction is preferably within a range from 0° or more to 20° or less. The inclination angle of the third extending portion 42c in the tire width direction with respect to the tire circumferential direction is preferably within a range from 65° or more to 85° or less.

In the present embodiment, by the two bent portions 43 of the bent lug groove 42 bending in the same direction, the bent lug grooves 42 open to the outer circumferential groove 35 and extend in the tire width direction. When the entire bent lug groove 42 is viewed, the bent lug groove 42 is formed in a shape of being folded back toward the outer circumferential groove 35. In other words, the bent lug groove 42 is formed such that as the third extending portion 42c approaches from the second extending portion 42b side toward the terminating end portion 42d side, the bent lug groove 42 approaches the outer circumferential groove 35 to which the first extending portion 42a opens.

Additionally, the bent lug groove 42 has the first extending portion 42a, the second extending portion 42b, and the third extending portion 42c formed to have mutually different lengths. Specifically, in the bent lug groove 42, the length of the first extending portion 42a is the longest, and the length of the second extending portion 42b is the second longest, and the length of the third extending portion 42c is the shortest. That is, the lengths of the first extending portion 42a, the second extending portion 42b, and the third extending portion 42c included in the bent lug groove 42 satisfy the relationship: the length of the first extending portion 42a>the length of the second extending portion 42b>the length of the third extending portion 42c.

The bent lug groove 42 has the plurality of bent portions 43. The plurality of bent portions 43 included in the bent lug groove 42 are disposed within the range 40% of the maximum width of the land portion 20 in the tire width direction with the center in the tire width direction of the land portion 20 in which the bent lug groove 42 is disposed as the center. That is, all of the two bent portions 43 included in the bent lug groove 42 are disposed in a placement region AP1 as a range 40% of a maximum width WB1 of the first second land portion 22a in the tire width direction with a center CB1 in the width direction of the first second land portion 22a in which the bent lug groove 42 is disposed as a center.

In other words, the placement region AP1 here is a region in the range 20% of the maximum width WB1 of the first second land portion 22a to each of both sides in the tire width direction of the center CB1 of the first second land portion 22a in the tire width direction. That is, the placement region AP1 is a region in a range between a position of 30% and a position of 70% in a case where a position on one end side is defined as 0% and a position on the other end side is defined as 100% in both ends in the tire width direction of the portion of the maximum width WB1 of the first second land portion 22a in the tire width direction.

In the bent lug groove 42, the terminating end portion 42d in the first second land portion 22a is also positioned in the placement region AP1. Thus, in the bent lug groove 42, the second extending portion 42b and the third extending portion 42c are also positioned in the placement region AP1.

The plurality of bent lug grooves 42 are disposed in the first second land portion 22a, and the plurality of bent lug grooves 42 are disposed side by side having the same shape in the tire circumferential direction. In this way, the plurality of bent lug grooves 42 disposed in the first second land portion 22a are preferably formed such that a whole length L in the tire circumferential direction satisfies the relationship $0.6 \leq (L/P) \leq 0.8$ with respect to a pitch P between the bent lug grooves 42 adjacent in the tire circumferential direction.

Furthermore, the bent lug groove 42 has the groove width that widens from the end portion side terminating in the land portion 20 to the end portion side opening to the circumferential groove 30, and the groove depth that deepens from the end portion side terminating in the land portion 20 to the end portion side opening to the circumferential groove 30. Specifically, the bent lug groove 42 has the groove width that widens and the groove depth that deepens from the terminating end portion 42d side of the bent lug grooves 42 toward the end portion side opening to the outer circumferential groove 35 in the bent lug groove 42 in the first second land portion 22a with the position of the bent portion 43 as a boundary.

The bent lug groove 42 has the different groove widths with the position of the bent portion 43 as the boundary, and therefore the groove widths of the bent lug groove 42 mutually differ between the first extending portion 42a, the second extending portion 42b, and the third extending portion 42c. Specifically, in the groove width of the bent lug groove 42, a groove width Wg1 of the first extending portion 42a, a groove width Wg2 of the second extending portion 42b, and a groove width Wg3 of the third extending portion 42c satisfy the relationship $Wg1 > Wg2 > Wg3$.

Additionally, in the first second land portion 22a, which is the land portion 20 in which the bent lug groove 42 is disposed, a communicating sipe 61 that opens to the circumferential groove 30 different from the circumferential groove 30 on the side where the bent lug groove 42 opens and to the bent lug groove 42 is disposed. That is, the communicating sipe 61 has one end opening to the first inner circumferential groove 31a, which is the circumferential groove 30 different from the circumferential groove 30 on the side where the bent lug groove 42 opens among the two circumferential grooves 30 defining the first second land portion 22a, and the other end opening to the bent lug groove 42. Specifically, the communicating sipe 61 opens to the bent lug groove 42 at the position of the first bent portion 43a of the bent lug groove 42 and is formed along an extension line of the first extending portion 42a from the position of the first bent portion 43a toward the first inner circumferential groove 31a side, and has the end portion opening to the first inner circumferential groove 31a. The communicating sipe 61 formed between the bent lug groove 42 and the first inner circumferential groove 31a is formed as the straight-shaped sipe 60.

Additionally, the sipe 60 disposed in the first second land portion 22a is disposed to be inclined in the tire circumferential direction with respect to the tire width direction, in other words, the sipe 60 disposed in the first second land portion 22a is disposed to be inclined in the tire width direction with respect to the tire circumferential direction. Specifically, the sipe 60 disposed in the first second land portion 22a is inclined with respect to the tire circumferential direction in the direction same as the inclination direction of the first extending portion 42a, which is formed to have the longest length in the bent lug groove 42, in the tire width direction with respect to the tire circumferential direction.

Figure 4:
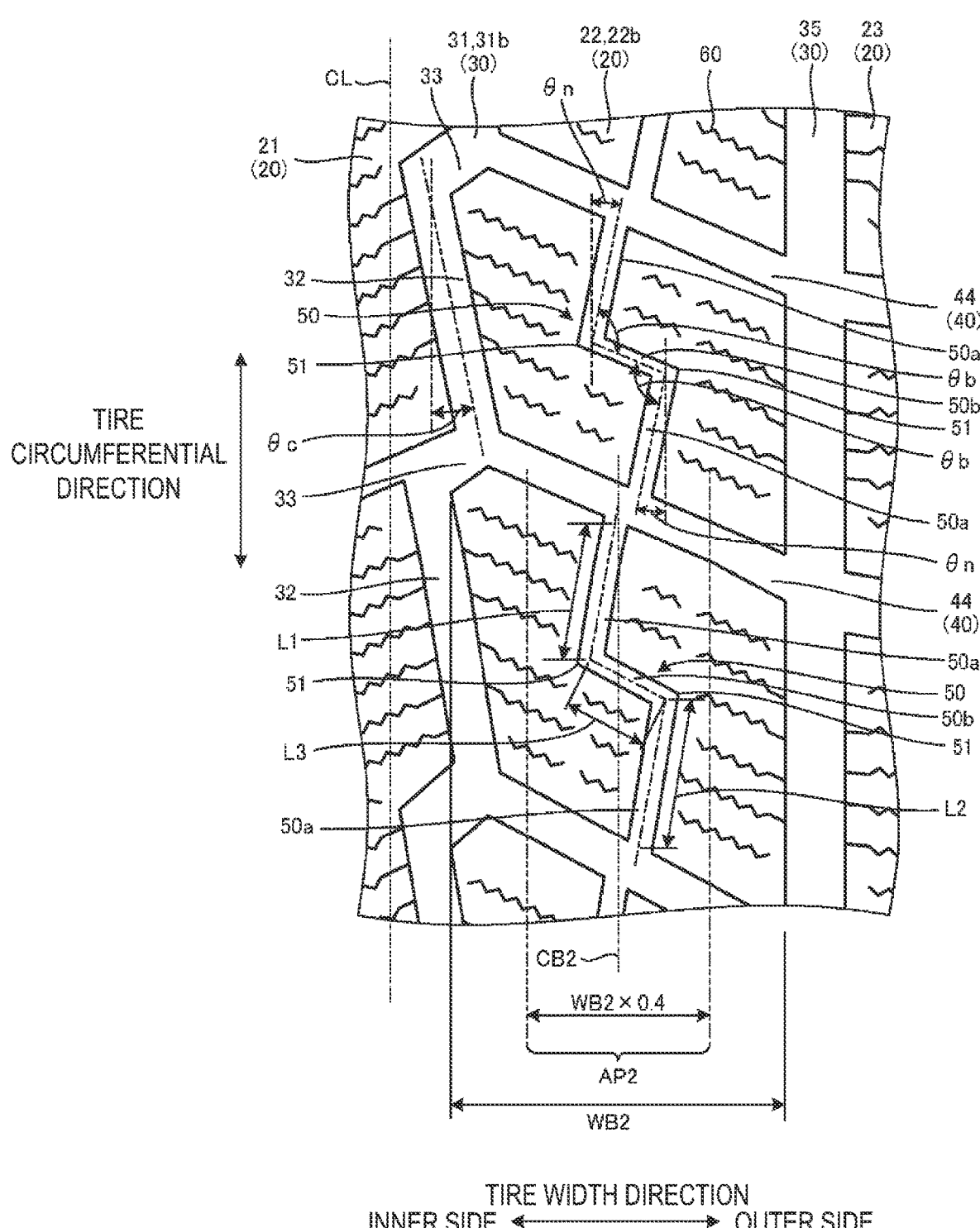
FIG. 4 is a detailed view of a portion C in FIG. 2.

FIG. 4 is a detailed view of portion C of FIG. 2. The circumferential narrow groove 50 disposed in the second land portion 22b, which is the block-shaped land portion 20, has one or more bent portions 51 where the extension direction changes in the second land portion 22b, and thus the circumferential narrow groove 50 has a long portion 50a and a short portion 50b having relatively different lengths. In the long portion 50a and the short portion 50b in this case, compared with the short portion 50b, the long portion 50a has a relatively long length. In the present embodiment, the circumferential narrow groove 50 has the two bent portions 51, that is, the circumferential narrow groove 50 is bent at two positions. The directions of bend of the two bent portions 51 in the groove width direction of the circumferential narrow groove 50 are directions opposite to one another. Therefore, the circumferential narrow groove 50 bending at two positions while extending in the tire circumferential direction is formed in a crank-like shape.

In the bent portions 51 included in the circumferential narrow groove 50, an angle θb of the bend of at least one bent portion 51 is 90° or more. In the present embodiment, both of the angles θb of the bends of the two bent portions 51 included in the circumferential narrow groove 50 are 90° or more. In this case, the angle θb of bend of the bent portion 51 is the angle on the minor angle side of the bend. That is, in the bent portion 51 of the circumferential narrow groove 50, the bend angle is formed by an obtuse angle. Also, the bend angle of the bent portion 51 is the angle at the center line of the groove width of the circumferential narrow groove 50. Note that the angle θb of the bent portion 51 of the circumferential narrow groove 50 is preferably within the range 90°≤θb≤140°.

In the circumferential narrow groove 50 formed in the crank-like shape, a portion between the two bent portions 51 is the short portion 50b, and a portion between each bent portion 51 and the end portion opening to the communication lug groove 44 in the circumferential narrow groove 50 is the long portion 50a. In other words, the circumferential narrow groove 50 includes the two long portions 50a opening to the respective communication lug grooves 44 adjacent in the tire circumferential direction, and the short portion 50b disposed between the end portions on the opposite sides of the end portions on the sides opening to the communication lug grooves 44 in the two long portions 50a. Both of the two long portions 50a have the length longer than the short portions 50b, and the lengths are almost the same between the long portions 50a.

In addition, in the circumferential narrow groove 50, the total length of the long portions 50a included in the single circumferential narrow groove 50 is within the range from 60% or more to 90% or less of the whole length of the single circumferential narrow groove 50. That is, in the circumferential narrow groove 50, when the length of one long portion 50a is defined as L1 and the length of the other long portion 50a is defined as L2 among the two long portions 50a, and the length of the short portion 50b is defined as L3, the total length (L1+L2) of the long portions 50a is within the range from 60% or more to 90% or less of the whole length (L1+L2+L3) of the single circumferential narrow groove 50. That is, each length of the circumferential narrow grooves 50 satisfies the relationship 0.6≤(L1+L2)/(L1+L2+L3)≤0.9.

Both of the two long portions 50a included in the circumferential narrow groove 50 are inclined in the tire width direction with respect to the tire circumferential direction, and the inclination angles with respect to the tire circumferential direction are substantially the same size between the two long portions 50a. The inclination θn of the long portion 50a of the circumferential narrow groove 50 in the tire width direction with respect to the tire circumferential direction is in the range from 5° or more to 45° or less.

Note that the lengths L1, L2 of the long portions 50a, the length L3 of the short portion 50b, and the inclination θn of the long portion 50a of the circumferential narrow groove 50 are the lengths and the inclination on the center line of the groove width of the circumferential narrow groove 50.

The inclination direction of the short portion 50b included in the circumferential narrow groove 50 in the tire width direction with respect to the tire circumferential direction is the opposite direction. The circumferential narrow groove 50 is thus formed in the zigzag shape that forms an amplitude in the tire width direction while extending in the tire circumferential direction by the inclination directions in the tire width direction with respect to the tire circumferential direction being mutually opposite directions between the long portion 50a and the short portion 50b.

The sipe 60 disposed in the second land portion 22b is disposed to be inclined in the tire circumferential direction with respect to the tire width direction. In other words, the sipe 60 disposed in the second land portion 22b is disposed inclined in the tire width direction with respect to the tire circumferential direction. Specifically, the sipe 60 disposed in the second land portion 22b is inclined with respect to the tire circumferential direction in the direction opposite to the inclination direction of the long portion 50a of the circumferential narrow groove 50 in the tire width direction with respect to the tire circumferential direction.

The circumferential narrow groove 50 has the end portion opening to the communication lug groove 44. The circumferential narrow grooves 50 opening to the same communication lug groove 44 from the mutually opposite sides of the communication lug groove 44 in the groove width direction open to the communication lug groove 44 at the close positions in the tire width direction or open having portions at the same position in the tire width direction.

Among the two circumferential grooves 30 that define both sides in the tire width direction of the second land portion 22b in which the circumferential narrow groove 50 is disposed, the second inner circumferential groove 31b that defines that inner side in the tire width direction forms an amplitude in the tire width direction while extending in the tire circumferential direction to be formed in a zigzag shape. Additionally, the second inner circumferential groove 31b is formed in a zigzag shape having a long portion 32 and a short portion 33 having relatively different lengths, and the long portion 32 and the short portion 33 are alternately disposed with the position of bend of the zigzag as a boundary. In this case, in the long portion 32 and the short portion 33, the length of the long portion 32 is relatively longer than the short portions 33.

In this way, in the second inner circumferential groove 31b including the long portion 32 and the short portion 33 and formed in the zigzag shape, the cycle of the zigzag in the tire circumferential direction has the same size as the pitch of the adjacent communication lug grooves 44 in the tire circumferential direction. Thus, one long portion 32 and one short portion 33 included in the second inner circumferential groove 31b are located at the portions between the communication lug grooves 44 adjacent in the tire circumferential direction in the second inner circumferential groove 31b. As a result, one long portion 32 and one short portion 33 are positioned in the portions of defining one second land portion 22b in the second inner circumferential groove 31b. In other words, the portion formed by the second inner circumferential groove 31b in the single second land portion 22b is defined by a set of the long portion 32 and the short portion 33 included in the second inner circumferential groove 31b.

Since the second inner circumferential groove 31b is formed to have an amplitude in the tire width direction while extending in the tire circumferential direction, each of the long portion 32 and the short portion 33 is inclined in the tire width direction with respect to the tire circumferential direction, and the inclination directions in the tire width direction are opposite to one another. In the circumferential narrow groove 50 disposed in the second land portion 22b, the inclination direction of the long portion 50a in the tire width direction with respect to the tire circumferential direction is in the direction opposite to the long portion 32 of the second inner circumferential groove 31*b* inclined with respect to the tire circumferential direction. That is, in the circumferential narrow groove 50, the inclination direction in the tire width direction with respect to the tire circumferential direction of all of the two long portions 50*a* included in the circumferential narrow groove 50 are in the direction opposite to the long portions 32 of the second inner circumferential groove 31*b*.

The long portion 32 of the second inner circumferential groove 31*b* has an inclination θc in the tire width direction with respect to the tire circumferential direction in the range from 5° or more to 300 or less. In this case, the inclination θc of the long portion 32 of the second inner circumferential groove 31*b* is an inclination at the center line of the groove width of the second inner circumferential groove 31*b*. The long portion 50*a* of the circumferential narrow groove 50 is preferably formed such that the inclination θn in the tire width direction with respect to the tire circumferential direction is larger than the inclination θc of the long portion 32 of the second inner circumferential groove 31*b*.

Also, the bent portion 51 included in the circumferential narrow groove 50 is disposed within the range 40% of the maximum width of the land portion in the tire width direction with the center in the tire width direction of the land portion 20 in which the circumferential narrow groove 50 is disposed as the center. That is, all of the two bent portions 51 included in the circumferential narrow groove 50 are disposed in a placement region AP2 as a range 40% of a maximum width WB2 of the second land portion 22*b* in the tire width direction with a center CB2 in the width direction of the second land portion 22*b* in which the circumferential narrow groove 50 is disposed as a center.

In other words, the placement region AP2 here is a region in the range 20% of the maximum width WB2 of the second land portion 22*b* to each of both sides in the tire width direction of the center CB2 of the second land portion 22*b* in the tire width direction. That is, the placement region AP2 is a region in a range between a position of 30% and a position of 70% in a case where a position on one end side is defined as 0% and a position on the other end side is defined as 100% in both ends in the tire width direction of the portion of the maximum width WB2 of the second land portion 22*b* in the tire width direction.

Figure 5:
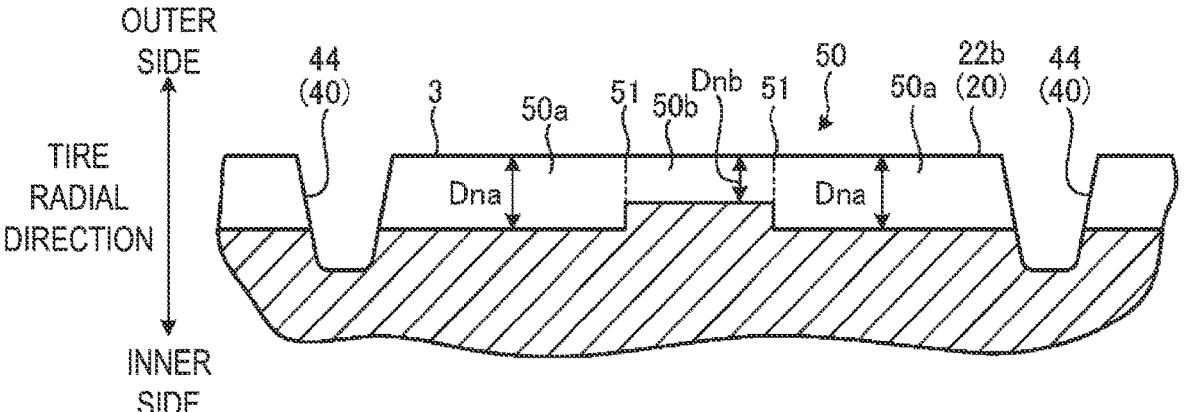
FIG. 5 is a schematic diagram of a cross-section along an extension direction of a circumferential narrow groove illustrated in FIG. 4.

Furthermore, the circumferential narrow groove 50 is formed with a change point of a groove depth at least at one location in the land portion 20. FIG. 5 is a schematic diagram of a cross-section along an extension direction of the circumferential narrow groove 50 illustrated in FIG. 4. The circumferential narrow groove 50 is formed with a change point of a groove depth at least at one location in the land portion 20. In the present embodiment, the circumferential narrow groove 50 has the change point of the groove depth at the position of the bent portion 51, and the groove depth differs with the position of the bent portion 51 as the boundary. That is, the circumferential narrow groove 50 has different groove depths between the long portion 50*a* and the short portion 50*b*, and a relationship between a groove depth Dna of the long portions 50*a* and a groove depth Dnb of the short portion 50*b* satisfies Dna>Dnb.

In the event of mounting the pneumatic tire 1 according to the present embodiment on a vehicle, the pneumatic tire 1 is mounted on a rim wheel and inflated with air inside to an inflated state, and then mounted to the vehicle. When the vehicle on which the pneumatic tires 1 are mounted travels, the pneumatic tires 1 rotate while, of the tread ground contact surface 3 on the tread portion 2, the tread ground contact surface 3 located at the bottom is in contact with the road surface. When the vehicle on which the pneumatic tires 1 are mounted travels on a dry road surface, the vehicle travels mainly by transmitting a driving force and a braking force to the road surface and generating a turning force by friction forces between the tread ground contact surface 3 and the road surface.

Additionally, during traveling on wet road surfaces, water between the tread ground contact surface 3 and the road surface enters into grooves, such as the circumferential grooves 30 and the lug grooves 40, and the sipes 60, and the vehicle travels while the water between the tread ground contact surface 3 and the road surface is drained by the grooves. As a result, the tread ground contact surface 3 easily contacts the road surface, and the vehicle can travel by the friction force between the tread ground contact surface 3 and the road surface.

In addition, when traveling on snow-covered road surfaces, the pneumatic tire 1 presses and compacts snow on the road surface with the tread ground contact surface 3 and, due to the snow on the road surface entering the circumferential grooves 30 and the lug grooves 40, the snow is also pressed and compacted into the grooves. In this state, when driving force or braking force acts on the pneumatic tire 1, or when a force in the tire width direction acts due to the vehicle turning, a so-called snow column shear force, which is a shearing force acting on the snow in the grooves, is generated between the pneumatic tire 1 and the snow. During traveling on snow-covered road surfaces, resistance is generated between the pneumatic tire 1 and the road surfaces by the snow column shear force, and thus driving force and braking force can be transmitted to the road surfaces, and snow traction properties can be ensured. As a result, the vehicle can travel on snow-covered road surfaces.

Additionally, during traveling on snow-covered road surfaces or icy road surfaces, the vehicle travels with the use of the edge effect of the circumferential grooves 30, the lug grooves 40, and the sipes 60. In other words, during traveling on snow-covered road surfaces or icy road surfaces, the vehicle travels with the use of resistance caused when the edges of circumferential grooves 30, the edges of the lug grooves 40, an d the edges of the sipes 60 are caught on the snow surface or the icy surface. Also, when the vehicle travels on icy road surfaces, water on the surface of the icy road surface is absorbed by the sipes 60 to remove water films between the icy road surface and the tread ground contact surface 3, so that the contact between the icy road surface and the tread ground contact surface 3 is facilitated. As a result, the resistance between the tread ground contact surface 3 and the icy road surface is increased due to a frictional force and the edge effect, making it possible to ensure the running performance of the vehicle on which the pneumatic tires 1 are mounted.

The circumferential grooves 30, the lug grooves 40, and the sipes 60 formed in the tread portion 2 contribute to ensuring the running performance during traveling on a wet road surface, snow-covered road surfaces, and icy road surfaces. Therefore, for example, to improve wet performance as running performance on wet road surfaces, increasing the groove area of the tread portion 2 is effective. That is, when the groove area, which is the area of the grooves, such as the circumferential grooves 30 and the lug grooves 40, is increased, the water on the road surface easily enters into the grooves during traveling on a wet road surface. Therefore, drainage properties of water between the tread ground contact surface 3 and the road surface can be enhanced, and wet performance can be improved.

The increase in groove area is also effective in improving performance on snow, which is the running performance on snow-covered road surfaces. That is, when the groove area is increased, the amount of snow that can enter into the circumferential groove 30 and the lug groove 40 during traveling on snow-covered road surfaces can be increased, and thus snow column shear force acting on the snow that has entered into the grooves can be increased. This allows improving the snow traction properties during traveling on snow-covered road surfaces and improving performance on snow.

Here, when the groove area in the tread portion 2 is increased, the land portion 20 defined by the circumferential grooves 30 and the lug grooves 40 decreases in volume as the groove area increases. When the volume of the land portion 20 decreases, the land portion 20 decreases rigidity. When the rigidity of the land portion 20 decreases, the land portion 20 easily deforms when a load acts, which makes it easier to flex. When the land portion 20 flexes, the ground contact area of the flexed land portion 20 is reduced, which possibly makes it difficult to ensure running performance.

For example, during traveling on icy road surfaces, in addition to the edge effect by the edge component of the groove, the friction force caused by ground of the tread ground contact surface 3 on icy road surfaces is also important. However, when the rigidity of the land portion 20 decreases by increasing the groove area in the tread portion 2, the land portion 20 easily flexes when a load acts. Thus, the ground contact area is easily reduced, and the running performance by frictional force is possibly difficult to be ensured. As a result of increasing the groove area in the tread portion 2, when the rigidity of the land portion 20 decreases, the land portion 20 easily flexes in braking during traveling on icy road surfaces, and thus the ground contact area easily decreases, and the braking performance on icy road surfaces is possibly easily reduced.

In contrast, in the pneumatic tire 1 according to the present embodiment, the second inner circumferential groove 31b among the plurality of circumferential grooves 30 is formed in the zigzag shape having the long portion 32 and the short portion 33, thereby ensuring the length of the second inner circumferential groove 31b. As a result, the groove area of the second inner circumferential groove 31b can be increased, and thus much snow can be entered into the second inner circumferential groove 31b when traveling on snow-covered road surfaces, and snow column shear force can be ensured. This allows increasing snow traction properties, allowing improving performance on snow.

In addition, by ensuring the length of the second inner circumferential groove 31b and increasing the groove area, much water can be entered into the second inner circumferential groove 31b when traveling on wet road surfaces. As a result, drainage properties when the water between the tread ground contact surface 3 and the road surface is drained by the second inner circumferential groove 31b can be increased, and wet performance can be improved.

Additionally, since the second inner circumferential groove 31b is formed in the zigzag shape, the snow column shear force on snow that has entered into the second inner circumferential groove 31b can be effectively exerted. This allows increasing snow traction properties more reliably and improving performance on snow.

Additionally, the circumferential narrow groove 50 is disposed in the second land portion 22b defined by the second inner circumferential groove 31b. Therefore, when traveling on wet road surfaces, the water between the tread ground contact surface 3 and the road surface can be entered into the circumferential narrow groove 50 and drainage properties can be ensured also by the circumferential narrow groove 50. Additionally, the circumferential narrow groove 50 is disposed in the second land portion 22b, and thus snow can be entered into the circumferential narrow groove 50 when traveling on snow-covered road surfaces, and snow column shear force can be more reliably ensured. Furthermore, the circumferential narrow groove 50 has one or more bent portions 51 where the extension direction changes in the second land portion 22b, and the length lengthens. As a result, much water and snow can be entered into the circumferential narrow groove 50, and drainage properties and snow column shear force by the circumferential narrow groove 50 can be increased.

Additionally, the circumferential narrow groove 50 including the bent portion 51 has the long portion 50a and the short portion 50b that are relatively different in length, and the long portion 50a of the circumferential narrow groove 50 has the inclination direction in the tire width direction with respect to the tire circumferential direction in the direction opposite the long portion 32 of the circumferential groove 30. Accordingly, to increase the groove area of the tread portion 2 by bending the circumferential narrow groove 50 and lengthening the length of the circumferential narrow groove 50, decrease in the rigidity of the second land portion 22b in which the circumferential narrow groove 50 is disposed can be suppressed. Specifically, in the circumferential narrow groove 50, the inclination direction of the long portion 50a is the direction opposite to the inclination direction of the long portion 32 of the circumferential groove 30, and thus it is possible to suppress the directivity of the rigidity of the second land portion 22b.

In other words, in a case where the inclination direction is the same direction between the long portion 50a of the circumferential narrow groove 50 and the long portion 32 of the circumferential groove 30, the land portion 20 in which the circumferential narrow groove 50 is disposed easily ensures rigidity in the extension directions of the long portion 50a of the circumferential narrow groove 50 and the long portion 32 of the circumferential groove 30, but rigidity is possibly difficult to be ensured in directions close to the directions orthogonal to the extension directions of the long portion 50a of the circumferential narrow groove 50 and the long portion 32 of the circumferential groove 30. In this case, in the land portion 20 in which the circumferential narrow groove 50 is disposed, when a load in the directions close to the directions orthogonal to the extension directions of the long portion 50a of the circumferential narrow groove 50 and the long portion 32 of the circumferential groove 30 acts, the land portion 20 easily flexes, and therefore the ground contact area decreases and the braking performance on icy road surfaces is possibly difficult to be ensured.

In contrast, in the present embodiment, the inclination direction of the long portion 50a of the circumferential narrow groove 50 in the tire width direction with respect to the tire circumferential direction is the direction opposite to the long portion 32 of the circumferential groove 30, and therefore generation of the direction in which rigidity against an acting load is weak in the second land portion 22b in which the circumferential narrow groove 50 is disposed can be suppressed. This makes it possible to suppress flex of the second land portion 22b when a load acts on the second land portion 22b regardless of the direction of the load. Accordingly, since the decrease in ground contact area due to flex of the second land portion 22b can be suppressed, performance on ice, which is the running performance on icy road surfaces including the braking performance when traveling on icy road surfaces, can be ensured. As a result, while the decrease in performance on ice is suppressed, performance on snow and wet performance can be ensured.

In addition, since the circumferential narrow groove 50 is formed so as to open to the lug groove 40, the water that has entered the circumferential narrow groove 50 when traveling on wet road surfaces can be flowed into the lug groove 40, and the snow that has entered the circumferential narrow groove 50 when traveling on snow-covered road surfaces can be flowed into the lug groove 40. This makes it possible to more reliably enhance drainage properties and snow discharge properties by the circumferential narrow groove 50. As a result, performance on snow and wet performance can be more reliably improved.

In addition, since the circumferential narrow groove 50 has at least one change point of groove depth, the snow column shear force in the circumferential narrow groove 50 when traveling on snow-covered road surfaces can also be generated at the position of the change point of groove depth. Accordingly, snow traction properties can be more reliably enhanced. In addition, by providing the change point of groove depth in the circumferential narrow groove 50, the flow of water in the circumferential narrow groove 50 can be generated when water enters into the circumferential narrow groove 50 when traveling on wet road surfaces, and the drainage properties in the circumferential narrow groove 50 can be enhanced. As a result, performance on snow and wet performance can be more reliably improved.

Additionally, since the long portion 50a of the circumferential narrow groove 50 has the inclination θn in the tire width direction with respect to the tire circumferential direction in the range from 5° or more to 45° or less, the drainage properties and the snow column shear force by the circumferential narrow groove 50 can be more reliably enhanced. In other words, when the inclination θn of the long portion 50a of the circumferential narrow groove 50 with respect to the tire circumferential direction is less than 5°, the inclination θn of the long portion 50a of the circumferential narrow groove 50 is too small, and therefore even when the circumferential narrow groove 50 is bent, the length of the circumferential narrow groove 50 is possibly difficult to effectively lengthen. In this case, even when the circumferential narrow groove 50 is bent, the drainage properties and the snow column shear force by the circumferential narrow groove 50 are possibly difficult to be effectively enhanced. In a case where the inclination θn of the long portion 50a of the circumferential narrow groove 50 with respect to the tire circumferential direction is greater than 45°, the inclination θn of the long portion 50a of the circumferential narrow groove 50 is too large, and thus the difference between the flow direction of the water and the rotation direction of the pneumatic tire 1 when water enters into the circumferential narrow groove 50 possibly becomes too large. In this case, it may be difficult to flow water efficiently within the circumferential narrow groove 50, and the drainage properties by the circumferential narrow groove 50 are possibly difficult to be effectively enhanced.

In contrast, when the inclination θn of the long portion 50a of the circumferential narrow groove 50 with respect to the tire circumferential direction is within the range 5° or more to 45° or less, it is possible to effectively increase the length of the circumferential narrow groove 50 while suppressing the excessively big difference between the flow direction of the water flowing in the circumferential narrow groove 50 and the rotation direction of the pneumatic tire 1. This makes it possible to more reliably enhance the drainage properties and the snow column shear force by the circumferential narrow groove 50. As a result, performance on snow and wet performance can be more reliably improved.

Additionally, since the inclination θc of the long portion 32 of the circumferential groove 30 in the tire width direction with respect to the tire circumferential direction is in the range of 5° or more to 30° or less, the drainage properties and the snow column shear force by the circumferential narrow groove 50 can be more reliably increased. That is, when the inclination θc of the long portion 32 of the circumferential groove 30 with respect to the tire circumferential direction is less than 5°, since the inclination θc of the long portion 32 of the circumferential groove 30 is too small, even when the circumferential groove 30 is formed in a zigzag shape, the length of the circumferential groove 30 is possibly difficult to effectively lengthen. In this case, even when the circumferential groove 30 is formed in the zigzag shape, the drainage properties and the snow column shear force by the circumferential grooves 30 is possibly difficult to be effectively enhanced. In a case where the inclination θc of the long portion 32 of the circumferential groove 30 in the tire width direction with respect to the tire circumferential direction is greater than 30°, the inclination θn of the long portion 32 of the circumferential groove 30 is too large, and thus the difference between the flow direction of the water and the rotation direction of the pneumatic tire 1 when water enters into the circumferential groove 30 possibly becomes too large. In this case, it may be difficult to flow water efficiently within the circumferential groove 30, and the drainage properties by the circumferential groove 30 are possibly difficult to be effectively enhanced.

In contrast, when the inclination θc of the long portion 32 of the circumferential groove 30 with respect to the tire circumferential direction is within the range 5° or more to 30° or less, it is possible to effectively increase the length of the circumferential groove 30 while suppressing the excessively big difference between the flow direction of the water flowing in the circumferential groove 30 and the rotation direction of the pneumatic tire 1. This makes it possible to more reliably enhance the drainage properties and the snow column shear force by the circumferential groove 30. As a result, performance on snow and wet performance can be more reliably improved.

Additionally, since the angle θb of the bent portion 51 included in the circumferential narrow groove 50 is 90° or more, the rigidity of the land portion 20 can be more reliably ensured and ease of flow of water within the circumferential narrow groove 50 can be ensured. In other words, when the angle θb of the bend of the bent portion 51 is less than 90°, that is, when the bent portion 51 is formed to be an acute angle, the rigidity of the portion located on the minor angle side of the bent portion 51 in the land portion 20 is possibly difficult to be ensured. In this case, flex of the land portion 20 when the load acts on the land portion 20 is possibly difficult to be effectively suppressed. In addition, when the angle θb of the bend of the bent portion 51 is less than 90°, the flow of water in the circumferential narrow groove 50 when water enters into the circumferential narrow groove 50 possibly becomes poor. In this case, the drainage properties in the circumferential narrow groove 50 are possibly difficult to be effectively ensured.

In contrast, when the angle θb of the bend of the bent portion 51 is 90° or more, the rigidity of the portion located on the minor angle side of the bent portion 51 in the land portion 20 is ensured, flex of the land portion 20 can be effectively suppressed, and ease of flow of water in the circumferential narrow groove 50 can be ensured. Accordingly, it is possible to more reliably suppress decrease in the ground contact area due to flex of the land portions 20, and more reliably ensure the drainage properties in the circumferential narrow grooves 50. As a result, performance on ice and wet performance can be more reliably provided in a compatible manner.

Additionally, in the circumferential narrow groove 50, the total length of the long portions 50a included in the single circumferential narrow groove 50 is in a range of 60% or more to 90% or less of the whole length of one circumferential narrow groove 50, and therefore while the rigidity of the land portion 20 can be more reliably ensured, the edge components of the circumferential narrow groove 50 can be ensured. In other words, when the total length of the long portions 50a included in the single circumferential narrow groove 50 is less than 60% of the whole length of the single circumferential narrow groove 50, the total length of the long portions 50a is too short and the length of the short portion 50b is relatively too long, and thus the rigidity of the land portion 20 in which the circumferential narrow groove 50 is disposed is possibly difficult to be ensured. In this case, flex of the land portion 20 when the load acts on the land portion 20 is possibly difficult to be effectively suppressed. In addition, when the total length of the long portions 50a included in the single circumferential narrow groove 50 is larger than 90% of the whole length of the single circumferential narrow groove 50, the total length of the long portions 50a is too long and the length of the short portion 50b is relatively too short, and thus the edge components of the circumferential narrow groove 50 are possibly difficult to be ensured. In this case, the edge effects brought by disposing the circumferential narrow grooves 50 in the land portion 20 are possibly difficult to be obtained.

In contrast, when the total length of the long portions 50a included in the single circumferential narrow groove 50 is within the range 60% or more to 90% or less of the whole length of the single circumferential narrow groove 50, while the rigidity of the land portion 20 in which the circumferential narrow grooves 50 are disposed is ensured and flex of the land portion 20 is effectively suppressed, the edge components of the circumferential narrow groove 50 can be ensured. Accordingly, it is possible to more reliably suppress decrease in the ground contact area due to flex of the land portions 20, and more reliably obtain the edge effect by the circumferential narrow grooves 50. As a result, performance on ice and performance on snow can be more reliably improved.

Also, since the bent portion 51 of the circumferential narrow groove 50 is disposed within a range of 40% of the maximum width WB2 of the second land portion 22b in the tire width direction with the center CB2 in the tire width direction of the second land portion 22b, which is the land portion 20 in which the circumferential narrow grooves 50 are disposed, as the center, the rigidity of the second land portion 22b can be more reliably ensured. That is, when the disposed position of the bent portion 51 is outside the range of 40% of the maximum width WB2 of the second land portion 22b, the distance between the circumferential groove 30 defining the second land portion 22b and the bent portion 51 becomes too small, and the rigidity of the portion between the bent portion 51 in the second land portion 22b and the circumferential groove 30 is possibly difficult to be ensured. In this case, flex of the second land portion 22b when a load acts on the second land portion 22b is difficult to be suppressed, and the reduction in ground contact area when the load acts is possibly difficult to be effectively suppressed.

In contrast, when the disposed position of the bent portion 51 of the circumferential narrow groove 50 is within 40% of the maximum width WB2 of the second land portion 22b, the excessively small distance between the circumferential groove 30 and the bent portion 51 can be suppressed, and the rigidity of the second land portion 22b can be ensured. This makes it possible to more reliably suppress the decrease in ground contact area due to flex of the second land portion 22b. As a result, performance on ice can be more reliably improved.

Additionally, since the groove width of the circumferential groove 30 is formed in the range of 4 mm or more to 12 mm or less, while the excessively low rigidity of the land portion 20 defined by the circumferential groove 30 is suppressed, the drainage properties and the snow column shear force by the circumferential groove 30 can be ensured. Additionally, since the groove width of the circumferential narrow groove 50 is formed in a range of 1.5 mm or more to 4 mm or less, while the excessively low rigidity of the land portion 20 in which the circumferential narrow groove 50 is disposed is suppressed, the drainage properties and the snow column shear force by the circumferential narrow groove 50 can be ensured. As a result, performance on snow and wet performance can be ensured while a decrease in performance on ice is more reliably suppressed.

In addition, since the plurality of sipes 60 extending in the tire width direction are disposed in the land portion 20, the edge components can be increased, and performance on ice can be improved during traveling on icy road surfaces by the edge effect. In addition, by disposing the plurality of sipes 60 in the land portion 20, the water on a road surface can be absorbed by the sipes 60 during traveling on wet road surfaces, and drainage properties can be improved. As a result, performance on ice and wet performance can be more reliably improved.

The sipe 60 disposed in the land portion 20 in which the circumferential narrow groove 50 is disposed is inclined with respect to the tire circumferential direction in the direction opposite to the inclination direction of the long portion 50a of the circumferential narrow groove 50 in the tire width direction with respect to the tire circumferential direction, and therefore the decrease in the rigidity of the land portion 20 in which the circumferential narrow groove 50 is disposed can be suppressed. That is, when the inclination directions of the long portion 50a of the circumferential narrow groove 50 and the sipe 60 with respect to the tire circumferential direction are the same direction, the land portion 20 in which the circumferential narrow groove 50 is disposed is possibly difficult to ensure rigidity in the direction close to the direction orthogonal to the extension directions of the long portion 50a of the circumferential narrow groove 50 and the sipe 60.

In contrast, when the inclination directions with respect to the tire circumferential direction are the opposite directions between the long portion 50a of the circumferential narrow groove 50 and the sipe 60, generation of the direction in which rigidity against an acting load is weak in the land portion 20 in which the circumferential narrow groove 50 is disposed can be suppressed. This makes it possible to suppress flex of the land portion 20 when a load acts on the land portion 20 regardless of the direction of the load, and the decrease in the ground contact area due to the flex of the land portion 20 can be suppressed. As a result, performance on ice can be more reliably improved.

Modified Examples

Figure 6:
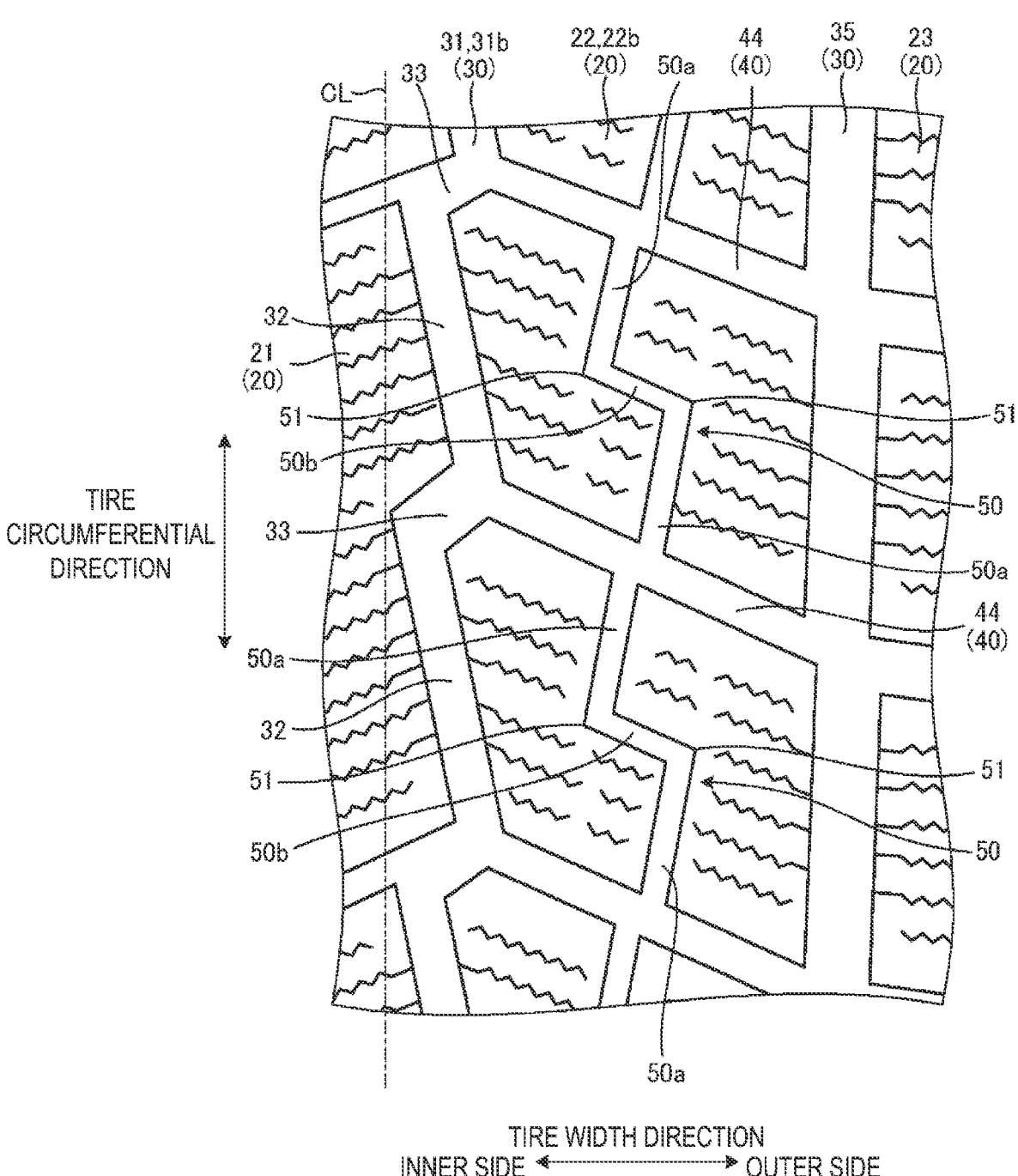
FIG. 6 is a plan view of a land portion where a circumferential narrow groove is disposed according to a modified example of the pneumatic tire according to an embodiment.

Note that in the embodiment described above, among the circumferential grooves 30 defining the land portion 20 in which the circumferential narrow groove 50 is disposed, the circumferential groove 30 defining the inner side in the tire width direction is formed in the zigzag shape, and the circumferential groove 30 defining the outer side in the tire width direction is formed in the linear shape, but the circumferential groove 30 may have an aspect other than that. FIG. 6 is a plan view of the land portion 20 in which the circumferential narrow groove 50 is disposed according to a modified example of the pneumatic tire 1 according to an embodiment. In the two circumferential grooves 30 defining both sides in the tire width direction of the land portion 20 in which the circumferential narrow groove 50 is disposed, for example, as illustrated in FIG. 6, both of the circumferential grooves 30 may be formed in zigzag shapes having an amplitude in the tire width direction while extending in the tire circumferential direction. In other words, the circumferential narrow groove 50 may be disposed in the land portion 20 having both sides in the tire width direction defined by the two circumferential grooves 30 formed in the zigzag shapes. In this case, the long portion 50a of the circumferential narrow groove 50 preferably has the inclination direction in the tire width direction with respect to the tire circumferential direction in the direction opposite to the long portion 32 of the circumferential groove 30 positioned on the inner side in the tire width direction among the two circumferential grooves 30 that define both sides in the tire width direction of the land portion 20 in which the circumferential narrow groove 50 is disposed.

That is, as illustrated in FIG. 6, when both circumferential grooves 30 of the second inner circumferential groove 31b and the outer circumferential groove 35 that define both sides in the tire width direction of the second land portion 22b in which the circumferential narrow groove 50 is disposed are formed in the zigzag shapes, the long portion 50a of the circumferential narrow groove 50 preferably has the inclination direction in the tire width direction with respect to the tire circumferential direction in the direction opposite to the long portion 32 of the second inner circumferential groove 31b that defines the inner side in the tire width direction of the second land portion 22b. During braking of the vehicle, a large load is likely to act on the position close to the inside in the tire width direction. However, when the inclination direction of the long portion 50a of the circumferential narrow groove 50 is set to be the direction opposite to the long portion 32 of the circumferential groove 30 that defines the inner side in the tire width direction of the land portion 20 in which the circumferential narrow groove 50 is disposed, the rigidity of the portion on the inner side in the tire width direction with respect to the circumferential narrow groove 50 in the land portion 20 in which the circumferential narrow groove 50 is disposed can be ensured.

This makes it possible to more reliably ensure the rigidity of the portion where a large load acts during braking in the land portion 20, and thus flex of the land portion 20 can be suppressed. Therefore, the decrease in the ground contact area of the portion where the large load acts during braking due to flex of the land portion 20 can be suppressed. Thus, performance on ice including breaking performance during travel on icy road surfaces can be more reliably ensured. As a result, performance on ice can be more reliably improved.

Note that, in a case where among the two circumferential grooves 30 defining both sides in the tire width direction of the land portion 20, the circumferential groove 30 defining the inner side in the tire width direction is formed in the linear shape and the circumferential groove 30 defining the outer side in the tire width direction is formed in the zigzag shape, the inclination direction of the long portion 50a of the circumferential narrow groove 50 is preferably formed in the direction opposite to the long portion 32 of the zigzag-shaped circumferential groove 30 defining the outer side in the tire width direction.

Additionally, in the embodiment described above, the end portions on both sides in the length direction of the circumferential narrow groove 50 open to the lug grooves 40. However, both end portions of the circumferential narrow groove 50 need not open to the lug grooves 40, and at least one end of the circumferential narrow groove 50 only needs to open to the lug groove 40. At least one end in the length direction of the circumferential narrow groove 50 opens to the lug groove 40, and thus, water and snow that have entered into the circumferential narrow groove 50 can flow into the lug groove 40, and the drainage properties and the snow discharge properties by the circumferential narrow groove 50 can be enhanced. This allows improving performance on snow and wet performance.

Additionally, although the circumferential narrow groove 50 has the two bent portions 51 in the embodiment described above, the bent portions 51 included in the circumferential narrow groove 50 may be other than at two locations, and the bent portion 51 may be disposed at, for example, one location. As long as the circumferential narrow groove 50 has one or more bent portions 51 where the extension direction changes to form the long portion 50a and the short portion 50b and the inclination direction of the long portion 50a is the direction opposite to the inclination direction of the long portion 32 of the circumferential groove 30, the number of bent portions 51 may be any number.

Additionally, in the embodiment described above, both of the two bent portions 51 included in the circumferential narrow groove 50 have the bend angle of 90° or more, but all of the bend angles of the bent portions 51 need not be 90° or more. In the bent portion 51, among the bent portions 51 included in the single circumferential narrow groove 50, the bend angle of at least one bent portion 51 only needs to be 90° or more. In the circumferential narrow groove 50, when the bend angle of at least one bent portion 51 is formed at 90° or more, while decrease in the rigidity of the land portion 20 in which the circumferential narrow grooves 50 are formed is suppressed, ease of flow of water in the circumferential narrow groove 50 can be ensured.

Additionally, in the embodiment described above, the circumferential narrow groove 50 is disposed in the second land portion 22b among the plurality of land portions 20 disposed side by side in the tire width direction, but the land portion 20 in which the circumferential narrow groove 50 is disposed may be the land portion 20 other than the second land portion 22b. Additionally, the circumferential narrow grooves 50 may be disposed in a plurality of the land portions 20 having mutually different positions in the tire width direction.

Moreover, in the embodiment described above, the four circumferential grooves 30 are disposed in the tread portion 2, but the number of circumferential grooves 30 may be other than four. Furthermore, the above-described embodiment and modified example may be combined as appropriate.

In the embodiment described above, although the pneumatic tire 1 is used for description as an example of the tire according to the embodiment of the present technology, the tire according to the embodiment of the present technology may be a tire other than the pneumatic tire 1. The tire according to the embodiment of the present technology may be, for example, a so-called airless tire that can be used without filling a gas.

EXAMPLES

FIGS. 7A-7B include a table showing results of performance evaluation tests of pneumatic tires. In relation to the pneumatic tire 1 described above, description will be given of performance evaluation tests conducted on a pneumatic tire according to Conventional Example, the pneumatic tires 1 according to embodiments of the present technology, and pneumatic tires according to Comparative Examples to be compared with pneumatic tires 1 according to the embodiments of the present technology. The performance evaluation tests were conducted on braking performance on snow road surfaces, braking performance on icy road surfaces, and braking performance on wet road surfaces.

The performance evaluation tests were performed by assembling the pneumatic tires 1 having a tire nominal size of 195/65R15 91Q size specified by JATMA on JATMA standard rim wheels having a rim size of 15×6.5J, mounting the test tires on an evaluation vehicle that was a front-wheel passenger vehicle of 1800 cc displacement, adjusting air pressure to 250 kPa for front wheels and to 240 kPa for rear wheels, and then running the evaluation vehicle.

As the evaluation method for each test item, braking on snow was evaluated by carrying out a braking test with the evaluation vehicle mounted with the test tires on a test course of snow-covered road surfaces and expressing the reciprocal of a braking distance as an index with Conventional Example to be described later being assigned the value of 100. Larger index values of braking on snow indicate shorter braking distance on snow-covered road surfaces and superior performance of braking on snow.

Also, braking on ice was evaluated by carrying out a braking test with the evaluation vehicle mounted with the test tires on a test course of icy road surfaces and expressing the reciprocal of a braking distance as an index with Conventional Example to be described later being assigned the value of 100. Larger index values of braking on ice indicate shorter braking distance on icy road surfaces and superior performance of braking on ice.

Also, wet braking was evaluated by carrying out a braking test with the evaluation vehicle mounted with the test tires on a test course including wet road surfaces and expressing the reciprocal of a braking distance as an index with Conventional Example to be described later being assigned the value of 100. Larger index values of wet braking indicate shorter braking distance on wet road surfaces and superior performance of wet braking.

The performance evaluation tests were performed on nine types of pneumatic tires including a pneumatic tire according to Conventional Example as an example of a conventional pneumatic tire, Examples 1 to 7 corresponding to the pneumatic tires 1 according to an embodiment of the present technology, and Comparative Example corresponding to pneumatic tire to be compared with the pneumatic tires 1 according to an embodiment of to the present technology. Among these, in Conventional Example, the circumferential narrow groove does not have the bent portion, and the inclination direction is in the same direction as the inclination direction of the long portion of the circumferential groove. Additionally, in Comparative Example, the circumferential narrow groove does not have the bent portion.

In contrast, in Examples 1 to 7, which are examples of the pneumatic tires 1 according to an embodiment of the present technology, all of the circumferential narrow grooves 50 have the bent portions 51, and the inclination direction of the long portion 50a of the circumferential narrow groove 50 is the direction opposite to the inclination direction of the long portion 32 of the circumferential groove 30. Furthermore, the pneumatic tires 1 according to Examples 1 to 7 each differ in terms of disposed position of the circumferential groove 30 having the inclination direction of the long portion 32 in the direction opposite to the long portion 50a of the circumferential narrow groove 50 with respect to the circumferential narrow groove 50, whether at least one end of the circumferential narrow groove 50 opens to the lug groove 40, the groove depth of the circumferential narrow groove 50, the angle θn of the long portion 50a of the circumferential narrow groove 50 with respect to the tire circumferential direction, and the angle θc of the long portion 32 of the circumferential groove 30 with respect to the tire circumferential direction.

As a result of the performance evaluation tests by using the pneumatic tires 1, as shown in FIGS. 7A-7B, it is revealed that the pneumatic tires 1 according to Examples 1 to 7 can improve all performances of braking on snow, braking on ice, and wet braking compared to those of Conventional Example. In other words, the pneumatic tires 1 according to Examples 1 to 7 can ensure performance on snow and wet performance while suppressing a decrease in performance on ice.

The invention claimed is:

1. A tire, comprising:

a plurality of circumferential grooves extending in a tire circumferential direction;

a plurality of lug grooves extending in a tire width direction;

a plurality of land portions defined by the circumferential grooves and the lug grooves; and only a single one of a circumferential narrow groove that extends in the tire circumferential direction and is disposed in one of the land portions, the circumferential narrow groove having a narrower groove width in the tire width direction than a groove width of each of the circumferential grooves;

a zigzag circumferential groove is disposed having an amplitude in the tire width direction while extending in the tire circumferential direction to be formed in a zigzag shape comprising a long portion and a short portion having different lengths, the circumferential narrow groove having only two bent portions where an extension direction changes in the one of the land portions to comprise a plurality of long portions and a short portion having different lengths, one of the long portions of the circumferential narrow groove opens to one of the lug grooves and has an inclination direction in the tire width direction with respect to the tire circumferential direction in a direction opposite to the long portion of the zigzag circumferential groove, wherein one end of the lug grooves opens to the zigzag circumferential groove and another end of the lug grooves opens to a shoulder circumferential groove provided on an outermost side in the tire width direction, an inclination direction of the one end to the another end of the lug grooves in the tire width direction with respect to the tire circumferential direction and an inclination direction of the short portion of the circumferential narrow groove in the tire width direction with respect to the tire circumferential direction are the same, the land portion including the circumferential narrow groove is disposed between the shoulder circumferential groove and the zigzag circumferential groove inward of the shoulder circumferential groove in the tire width direction, the shoulder circumferential groove extends in the tire circumferential direction to be formed in a linear shape, the short portion of the circumferential narrow groove is between the only two bent portions and the long portions are connected to each of two ends of the short portion, and the circumferential narrow groove has a groove width in a range of from 1.5 mm or more to 4 mm or less.

2. The tire according to claim 1, wherein the circumferential narrow groove has plural ends, one end opening to the one of the lug grooves and an other end opening to an other one of the lug grooves.

3. The tire according to claim 1, wherein the circumferential narrow groove has a change point of a groove depth at least at one location in the one of the land portions.

4. The tire according to claim 1, wherein at least one of the long portions of the circumferential narrow groove has an inclination in the tire width direction with respect to the tire circumferential direction in a range from 5° or more to 45° or less.

5. The tire according to claim 1, wherein the long portion of the zigzag circumferential groove has an inclination in the tire width direction with respect to the tire circumferential direction in a range from 5° or more to 30° or less.

6. The tire according to claim 1, wherein at least one bent portion among the only two bent portions comprised in the circumferential narrow groove has a bend angle of 90° or more.

7. The tire according to claim 1, wherein a total length of the long portions comprised in the circumferential narrow groove is in a range from 60% or more to 90% or less of a whole length of the circumferential narrow groove.

8. The tire according to claim 1, wherein at least one bent portion among the only two bent portions of the circumferential narrow groove is disposed in a range of 40% of a maximum width of the one of the land portions in the tire width direction with a center in the tire width direction of the one of the land portions in which the circumferential narrow groove is disposed as a center.

9. The tire according to claim 1, wherein the zigzag circumferential groove has the groove width in a range from 3.5 mm or more to 12 mm or less.

10. The tire according to claim 1, wherein at least some of the plurality of land portions intersect the tire equatorial plane.

11. The tire according to claim 1, wherein in the land portions, a plurality of sipes extending in the tire width direction are disposed.

12. The tire according to claim 11, wherein the sipes are inclined with respect to the tire circumferential direction in a direction opposite to the inclination direction of the long portions of the circumferential narrow groove in the tire width direction with respect to the tire circumferential direction.

13. A tire, comprising:

a plurality of circumferential grooves extending in a tire circumferential direction;

a plurality of lug grooves extending in a tire width direction;

a plurality of land portions defined by the circumferential grooves and the lug grooves; and only a single one of a circumferential narrow groove that extends in the tire circumferential direction and is disposed in one of the land portions, the circumferential narrow groove having a narrower groove width in the tire width direction than a groove width of each of the circumferential grooves;

a zigzag circumferential groove among the circumferential grooves that define the one of the land portions in which the circumferential narrow groove is disposed having an amplitude in the tire width direction while extending in the tire circumferential direction to be formed in a zigzag shape comprising a long portion and a short portion having different lengths, the circumferential narrow groove having only two bent portions where an extension direction changes in the one of the land portions to comprise a plurality of long portions and a short portion having different lengths, one of the long portions of the circumferential narrow groove opens to one of the lug grooves and has an inclination direction in the tire width direction with respect to the tire circumferential direction in a direction opposite to the long portion of the zigzag circumferential groove, wherein one end of the lug grooves opens to the zigzag circumferential groove and another end of the lug grooves opens to a zigzag shoulder circumferential groove provided on an outermost side in the tire width direction, an inclination direction of the one end to the another end of the lug grooves in the tire width direction with respect to the tire circumferential direction and an inclination direction of the short portion of the circumferential narrow groove in the tire width direction with respect to the tire circumferential direction are the same, the land portion including the circumferential narrow groove is disposed between the zigzag shoulder circumferential groove and the zigzag circumferential groove inward of the shoulder circumferential groove in the tire width direction, the short portion is between the only two bent portions, and the long portions are connected to each of the two ends of the short portion, and the circumferential narrow groove has a groove width in a range of from 1.5 mm or more to 4 mm or less.

14. The tire according to claim 13, wherein at least some of the plurality of land portions intersect the tire equatorial plane.

15. The tire according to claim 13, wherein the circumferential narrow groove has one end opening to one of the lug grooves and another end opening to another one of the lug grooves.

16. The tire according to claim 15, wherein the circumferential narrow groove has a change point of a groove depth at least at one location in the one of the land portions.

17. The tire according to claim 16, wherein at least one of the long portions of the circumferential narrow groove has an inclination in the tire width direction with respect to the tire circumferential direction in a range from 5° or more to 45° or less.

18. The tire according to claim 17, wherein the long portion of the zigzag circumferential groove has the inclination in the tire width direction with respect to the tire circumferential direction in a range from 5° or more to 30° or less.

19. The tire according to claim 18, wherein at least one bent portion among the only two bent portions comprised in the circumferential narrow groove has a bend angle of 90° or more.

20. The tire according to claim 19, wherein in the circumferential narrow groove, the long portion comprises a plurality of long portions and a total length of the long portions comprised in the circumferential narrow groove is in a range from 60% or more to 90% or less of a whole length of the circumferential narrow groove.

21. The tire according to claim 20, wherein the at least one bent portion among the only two bent portions of the circumferential narrow groove is disposed in a range of 40% of a maximum width of the one of the land portions in the tire width direction with a center in the tire width direction of the one of the land portions in which the circumferential narrow groove is disposed as a center.

22. The tire according to claim 21, wherein the zigzag circumferential groove has the groove width in a range from 3.5 mm or more to 12 mm or less, in the land portions, a plurality of sipes extending in the tire width direction are disposed, and the sipes are inclined with respect to the tire circumferential direction in a direction opposite to the inclination direction of the long portion of the circumferential narrow groove in the tire width direction with respect to the tire circumferential direction.

\* \* \* \* \*